United States Patent
Ohsuga et al.

(10) Patent No.: US 9,660,883 B2
(45) Date of Patent: May 23, 2017

(54) COMPUTER PRODUCT, MONITORING METHOD, AND MONITORING APPARATUS

(71) Applicant: FUJITSU LIMITED, Kawasaki-shi, Kanagawa (JP)

(72) Inventors: Kadohito Ohsuga, Numazu (JP); Hiroe Akagi, Izunokuni (JP); Yuuko Aki, Sagamihara (JP)

(73) Assignee: FUJITSU LIMITED, Kawasaki (JP)

( * ) Notice: Subject to any disclaimer, the term of this patent is extended or adjusted under 35 U.S.C. 154(b) by 395 days.

(21) Appl. No.: 14/313,142

(22) Filed: Jun. 24, 2014

(65) Prior Publication Data

US 2014/0310409 A1    Oct. 16, 2014

Related U.S. Application Data

(63) Continuation of application No. PCT/JP2011/080511, filed on Dec. 28, 2011.

(51) Int. Cl.
  *H04L 12/26*  (2006.01)
  *G06F 11/30*  (2006.01)

(52) U.S. Cl.
  CPC .......... *H04L 43/08* (2013.01); *G06F 11/3065* (2013.01); *G06F 2201/815* (2013.01)

(58) Field of Classification Search
  CPC .......... G06F 2009/4557; G06F 9/5072; G06F 2009/45583; G06F 9/5088; G06F 9/505;
  (Continued)

(56) References Cited

U.S. PATENT DOCUMENTS 8,307,362 B1 * 11/2012 Gong ................. G06F 9/5077
                                                    718/1
2005/0246453 A1    11/2005 Erlingsson et al.
(Continued)

FOREIGN PATENT DOCUMENTS

JP    2000-31969    1/2000
JP    2005-322242    11/2005
(Continued)

OTHER PUBLICATIONS

International Search Report issued Mar. 6, 2012, in corresponding International Patent Application No. PCT/JP2011/080511.
(Continued)

*Primary Examiner* — Ruolei Zong
(74) *Attorney, Agent, or Firm* — Staas & Halsey LLP

(57) ABSTRACT

A non-transitory, computer-readable recording medium stores a monitoring program that causes a computer to execute a process that includes acquiring from a server among a group of servers that are migration candidates for a monitored virtual machine, identification information of a virtual machine operating on the server; identifying classification of the virtual machine that corresponds to the acquired identification information, by referring to a storage unit that correlates and stores identification information of the monitored virtual machine and classification of the monitored virtual machine; and correlating and outputting the identified classification of the virtual machine, the identification information of the virtual machine, and identification information of the server.

6 Claims, 15 Drawing Sheets

(58) Field of Classification Search
CPC ... H04L 47/821; H04L 47/125; H04L 47/822; H04L 47/823; H04L 41/5003; H04L 43/08; H04L 47/2425; H04L 47/805
USPC .......................................................... 709/224
See application file for complete search history.

(56) References Cited

U.S. PATENT DOCUMENTS

| | | | |
|---|---|---|---|
| 2008/0046960 A1* | 2/2008 | Bade | G06F 9/4856 726/1 |
| 2009/0240790 A1 | 9/2009 | Utsunomiya et al. | |
| 2010/0332661 A1 | 12/2010 | Tameshige | |
| 2011/0173608 A1* | 7/2011 | Buragohain | G06F 9/45558 718/1 |
| 2011/0238820 A1 | 9/2011 | Matsuoka | |
| 2011/0283277 A1* | 11/2011 | Castillo | G06F 9/5077 718/1 |
| 2011/0307889 A1* | 12/2011 | Moriki | G06F 9/45558 718/1 |
| 2012/0131379 A1 | 5/2012 | Tameshige et al. | |
| 2013/0019087 A1 | 1/2013 | Osaki et al. | |

FOREIGN PATENT DOCUMENTS

| | | |
|---|---|---|
| JP | 2009-232207 | 10/2009 |
| JP | 2010-9411 | 1/2010 |
| JP | 2011-8481 | 1/2011 |
| JP | 2011-128967 | 6/2011 |
| JP | 2011-141609 | 7/2011 |
| JP | 2011-197847 | 10/2011 |
| JP | 2011-198299 | 10/2011 |

OTHER PUBLICATIONS

Japanese Office Action dated Sep. 15, 2015 in corresponding Japanese Patent Application No. 2013-551155.
PCT International Preliminary Report on Patentability mailed Jul. 10, 2014 in corresponding International Patent Application No. PCT/JP2011/080511.

* cited by examiner

DEVICE INFORMATION DB 700

| | IP ADDRESS | NAME | MODEL NAME | CLASSIFI-CATION | STATE | IDENTIFI-CATION ID | HOST NAME | MIGRATION SERVER |
|---|---|---|---|---|---|---|---|---|
| 700-1 | 192.168.1.101 | fw11 | IPCOM | vnet | normal | aaaaaa | SB1 | SB2, SB3 |
| 700-2 | 192.168.1.102 | fw12 | IPCOM | vnet | normal | bbbbbb | SB1 | SB2, SB3 |
| ----- | 192.168.1.201 | vsw11 | SWITCH | vnet | normal | cccccc | SB2 | SB1, SB3 |
| | 192.168.1.202 | vsw12 | SWITCH | vnet | normal | dddddd | SB2 | SB1, SB3 |
| 700-5 | 192.168.1.11 | SB1 | BX600 | pserv | normal | | | |
| | 192.168.1.12 | SB2 | BX600 | pserv | normal | | | |
| ----- | 192.168.1.13 | SB3 | BX600 | pserv | normal | | | |
| | 192.168.1.21 | SWB1 | SWB | pnet | normal | | | |
| 700-9 | 192.168.1.31 | SW1 | SR-X | pnet | normal | | | |
| | ... | ... | ... | ... | ... | ... | ... | ... |

FIG.8

CONNECTION INFORMATION DB — 800

| CONNECTION SOURCE IP | CONNECTION SOURCE PORT NAME | CONNECTION DESTINATION IP | CONNECTION DESTINATION PORT NAME |
|---|---|---|---|
| 192.168.1.11 | p1 | 192.168.1.21 | p1 |
| 192.168.1.12 | p1 | 192.168.1.21 | p2 |
| 192.168.1.21 | p3 | 192.168.1.31 | p1 |
| 192.168.1.31 | p2 | 192.168.1.41 | p1 |
| 192.168.1.31 | p3 | 192.168.1.42 | p1 |
| 192.168.1.31 | p4 | 192.168.1.43 | ... |
| ... | ... | ... | ... |

800-1, 800-2, ........ 800-6

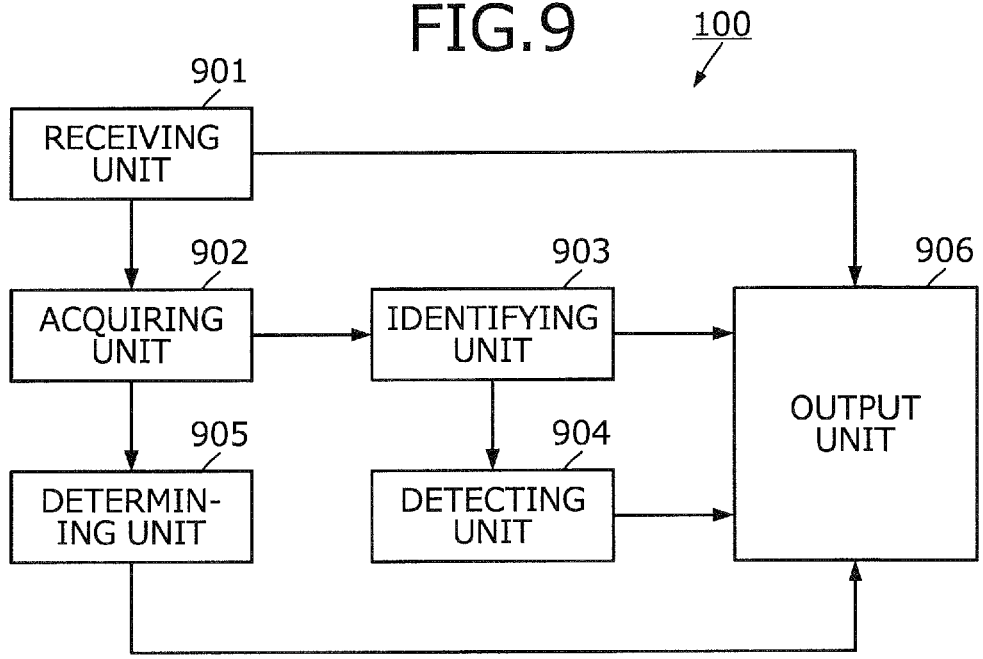

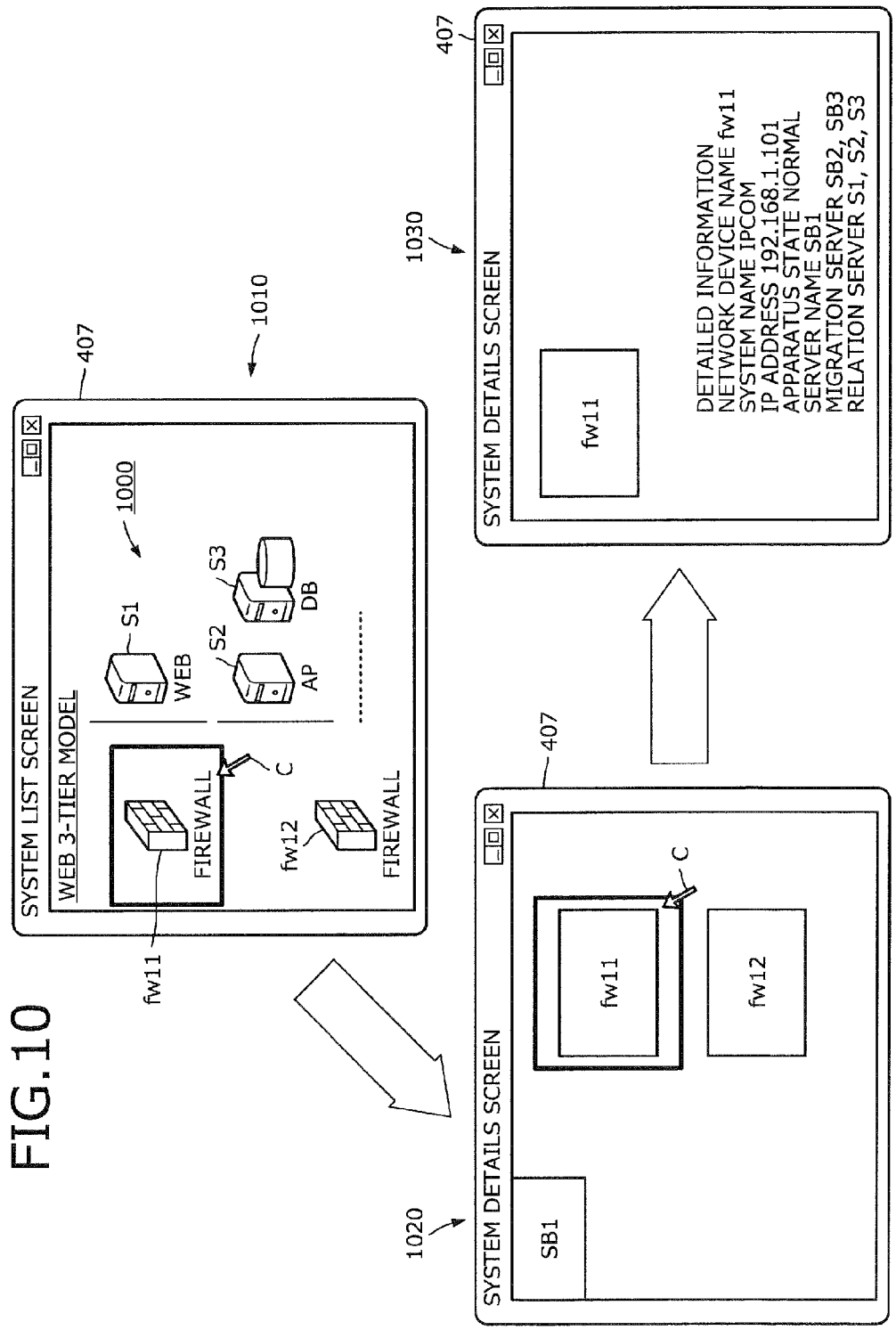

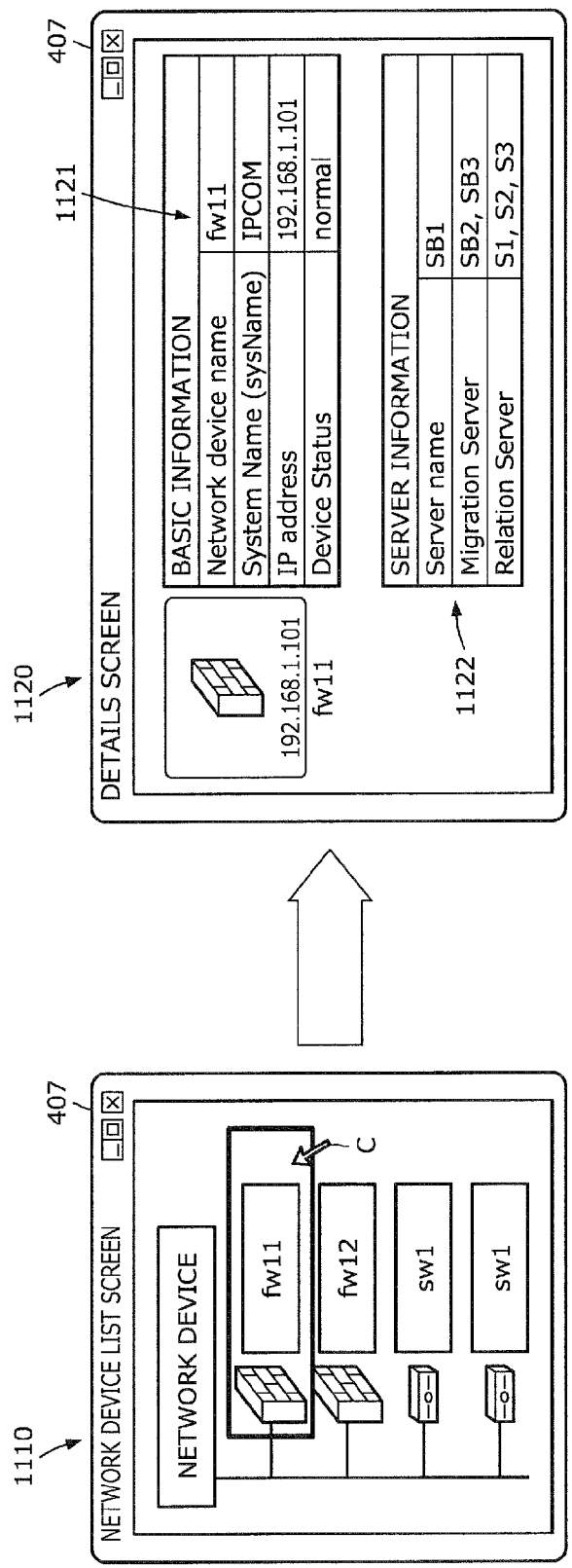

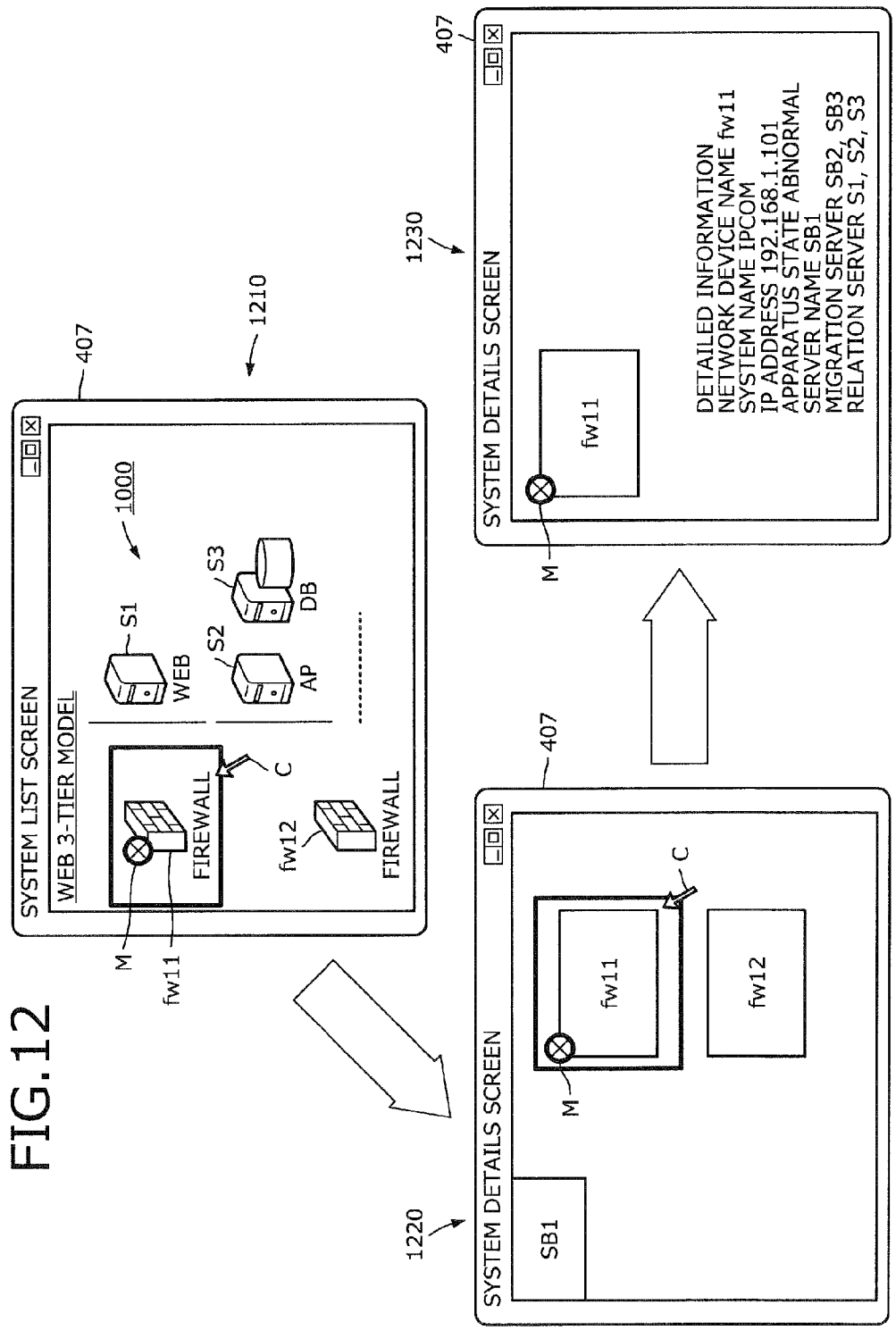

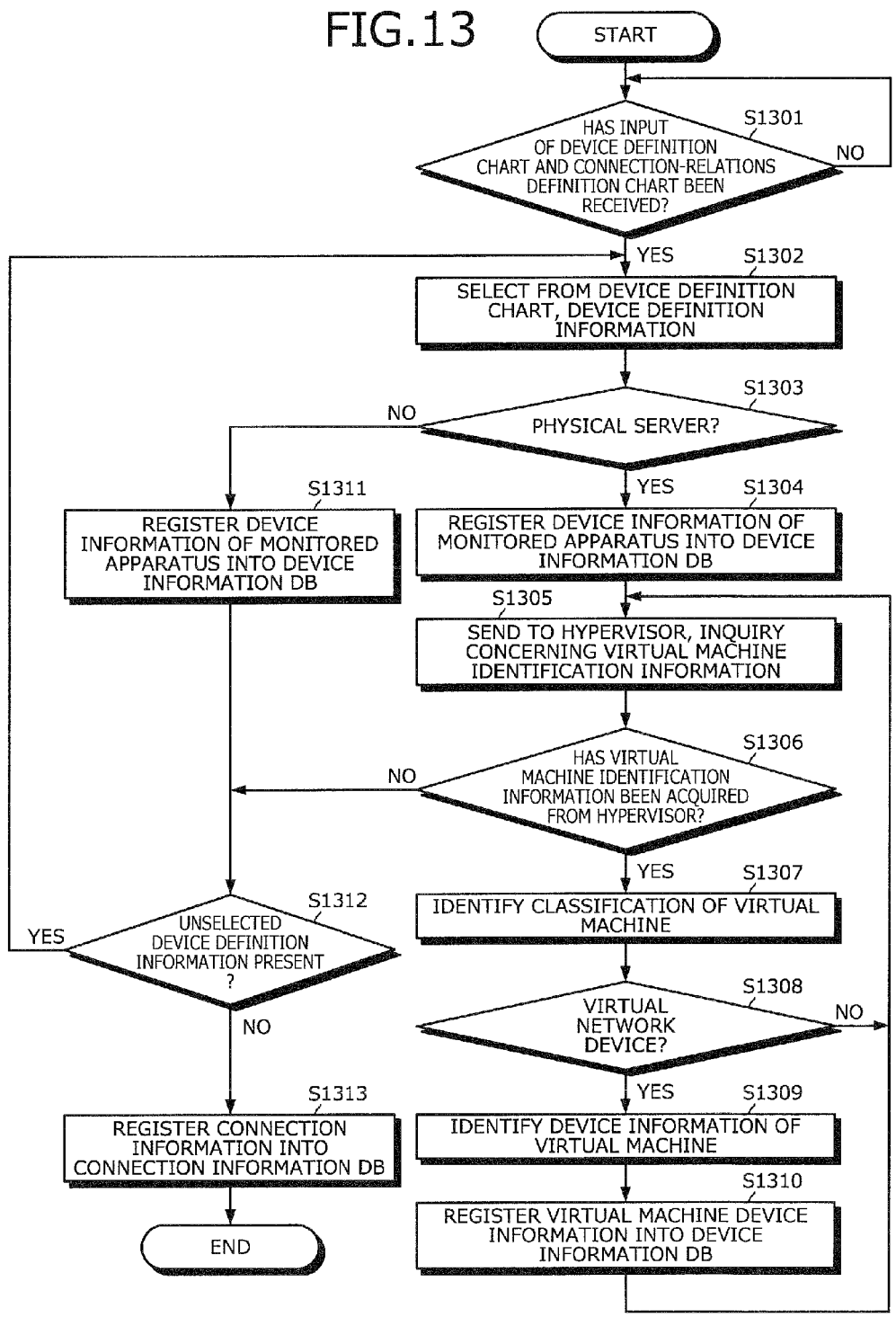

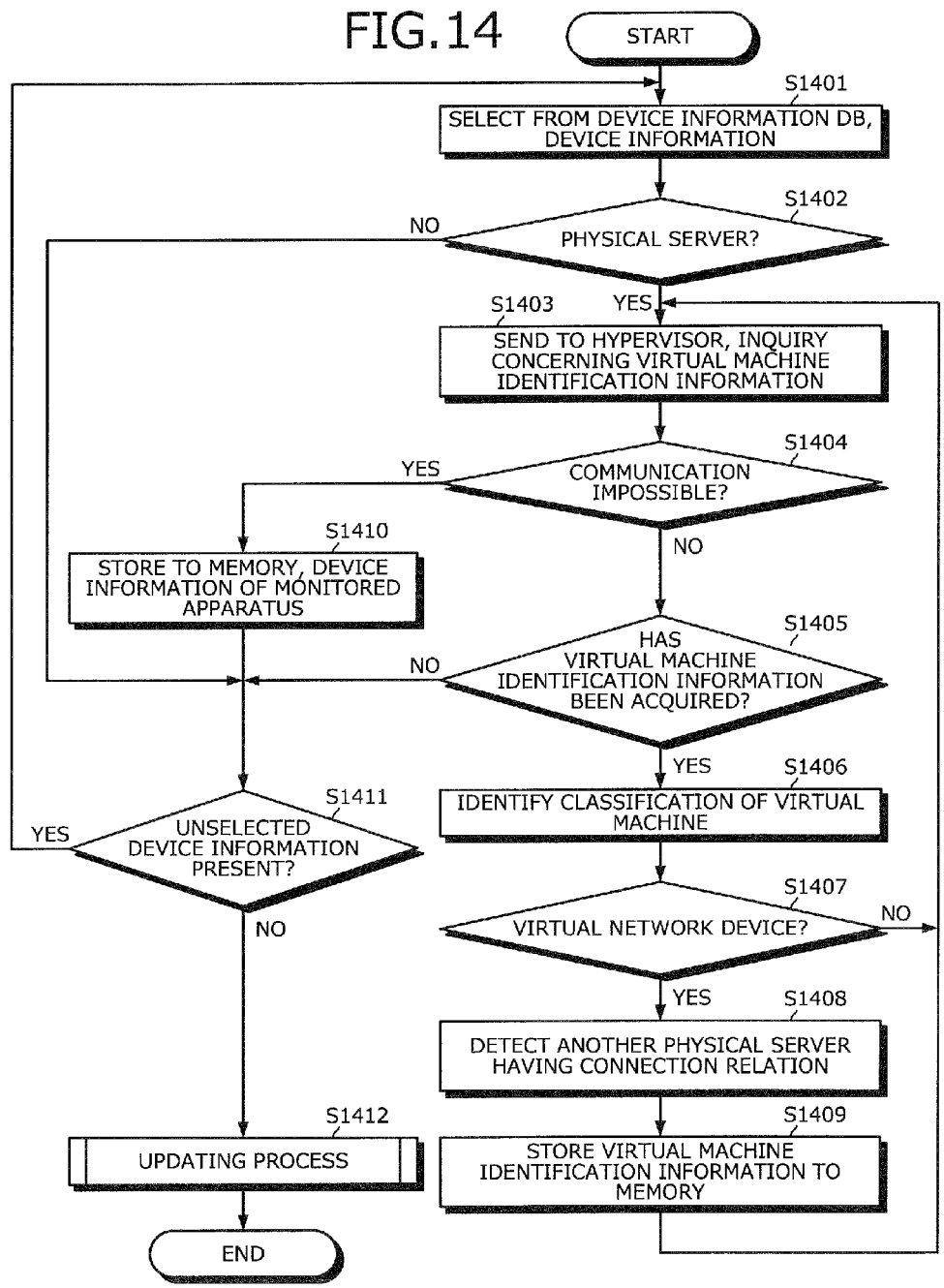

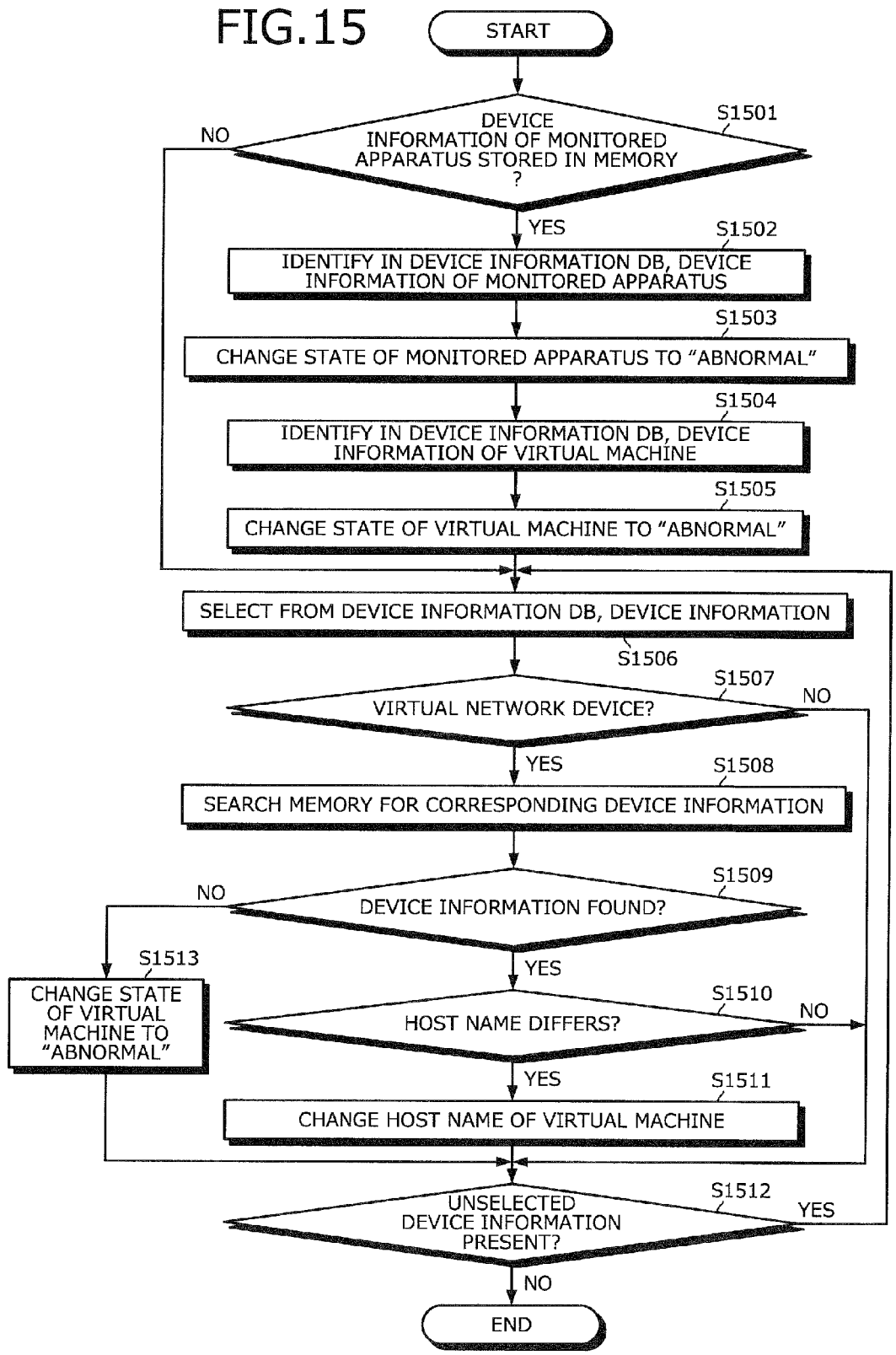

COMPUTER PRODUCT, MONITORING METHOD, AND MONITORING APPARATUS

CROSS REFERENCE TO RELATED APPLICATIONS

This application is a continuation application of International Application PCT/JP2011/080511, filed on Dec. 28, 2011 and designating the U.S., the entire contents of which are incorporated herein by reference.

FIELD

The embodiments discussed herein are related to a computer product, a monitoring method, and a monitoring apparatus.

BACKGROUND

Conventionally, in an information technology (IT) system, virtual network devices such as virtual firewalls, virtual routers, virtual load balancers, etc. are recognized and managed as physical network devices.

According to a related technology, for example, a system receives notification of the occurrence of a failure event from a virtual computer and based on details concerning the failure event, identifies a virtual machine that may be affected by the failure. According to another related technology, a multicast type network that transmits transmission signals from a single transmitter to multiple receivers is managed. Further, according to another related technology, a device driver in a virtual environment can communicate with legacy hardware. For examples, refer to Japanese Laid-Open Patent Publication Nos. 2010-9411, 2000-31969, and 2005-322242.

Nonetheless, with the conventional technologies, a problem arises in that it is difficult to determine on which physical server in a system, a virtual network device is operating. For example, a virtual network device may be migrated between physical servers, making it difficult to determine on which physical server the virtual network device is operating.

SUMMARY

According to an aspect of an embodiment, a non-transitory, computer-readable recording medium stores a monitoring program that causes a computer to execute a process that includes acquiring from a server among a group of servers that are migration candidates for a monitored virtual machine, identification information of a virtual machine operating on the server; identifying classification of the virtual machine that corresponds to the acquired identification information, by referring to a storage unit that correlates and stores identification information of the monitored virtual machine and classification of the monitored virtual machine; and correlating and outputting the identified classification of the virtual machine, the identification information of the virtual machine, and identification information of the server.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 8 is a diagram depicting an example of the contents of a connection information DB 800;

FIG. 9 is a block diagram of a functional configuration example of the monitoring apparatus 100;

FIG. 10 is a diagram depicting a screen example of a display 407 (part 1);

FIG. 11 is a diagram depicting a screen example of the display 407 (part 2);

FIG. 12 is a diagram depicting a screen example of the display 407 (part 3);

FIG. 13 is a flowchart of a procedure of a registration process of the monitoring apparatus 100;

FIG. 14 is a flowchart of an example of a procedure of a monitoring process of the monitoring apparatus 100; and FIG. 15 is a flowchart of a procedure of an updating process.

DESCRIPTION OF EMBODIMENTS

Embodiments of a computer product, a monitoring method, and a monitoring apparatus will be described in detail with reference to the accompanying drawings.

Figure 1:
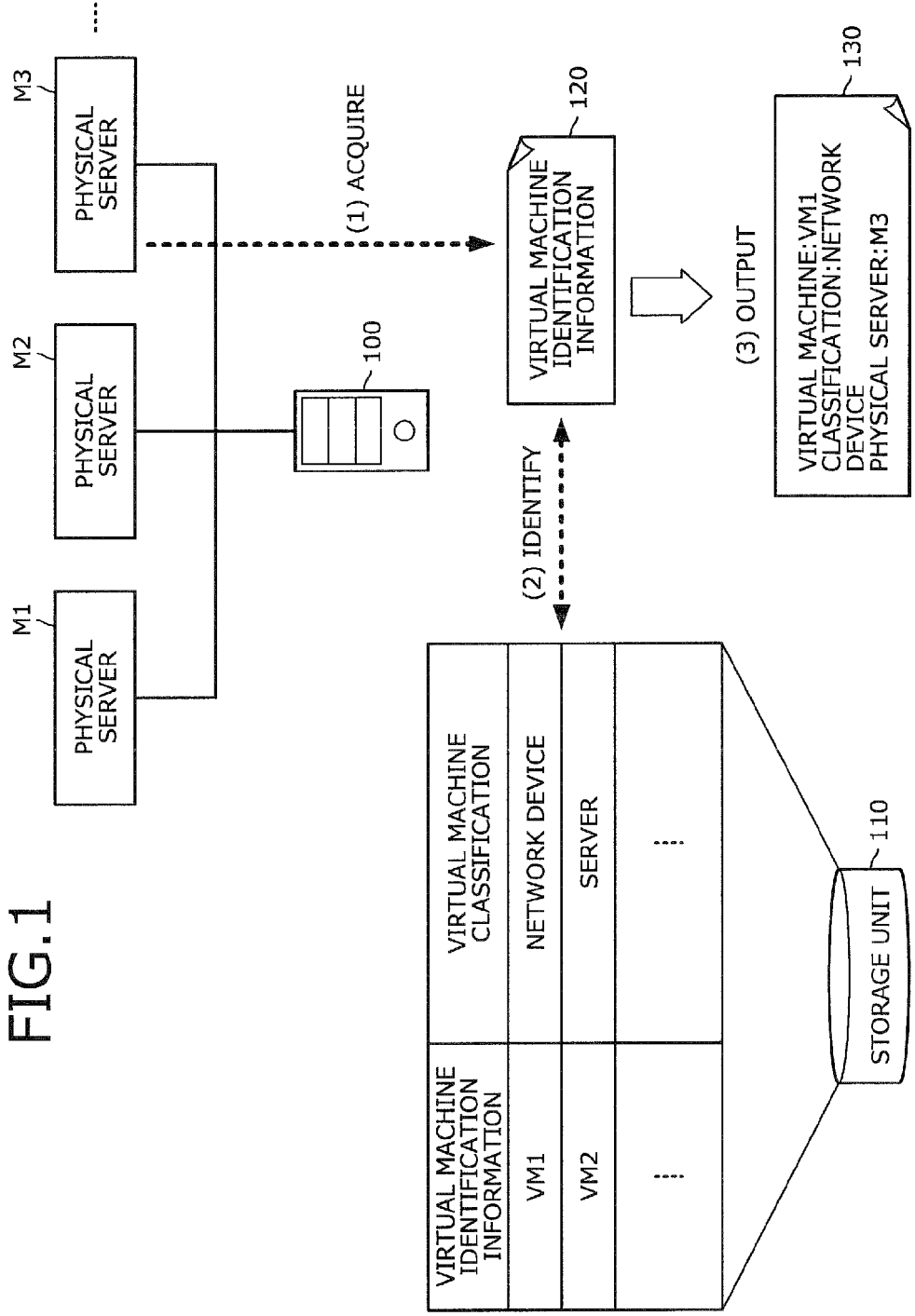
FIG. 1 is a diagram depicting one example of a monitoring method according to a first embodiment.

FIG. 1 is a diagram depicting one example of a monitoring method according to a first embodiment. In FIG. 1, a monitoring apparatus 100 is a computer configured to access a physical server group (e.g., physical servers M1 to M3) of migration candidates for a virtual machine (VM) subject to monitoring. Further, the monitoring apparatus 100 has a function of identifying classifications of virtual machines operating on the physical servers.

A physical server is a computer that virtualizes hardware resources thereof and can execute different operating systems (OSs). A hardware resource of a physical server is, for example, a central processing unit (CPU), memory, interface (I/F), etc. of the physical server.

For example, a physical server runs an OS on a virtual machine operating in an execution environment built by dividing the hardware resources of the physical server. Further, the physical server has a function of migrating a virtual machine operating on the physical server to another physical server.

Here, a virtual machine is a virtual computer that operates in an execution environment built by dividing hardware resources of the physical server. A virtual machine is implemented by that which includes information specifying, for example, software such as programs and OSs, variables given to the software, and hardware resources for executing the software.

Further, the classification of a virtual machine represents the type of computer that the virtual machine is operating as and, for example, categorizes functions implemented by the virtual machine. Virtual machine classifications include, for example, virtual network devices, virtual servers, etc. A virtual network device is, for example, a virtual firewall, a virtual router, a virtual load balancer, etc.

In a network that includes a virtual network device, the virtual network device may be migrated between physical servers on the network. Further, if a failure occurs at the virtual network device, for example, a physical server present in a terminal of the network may be affected. Therefore, when a failure occurs at a virtual network device, it is important for a network manager to know on which physical server the virtual network device is operating and to determine which part of the overall network will be affected by the failure.

In the first embodiment, the monitoring apparatus 100 uses, as a clue, identification information that is for the virtual machines operating on a physical server and that is obtained from the physical server to refer to a storage unit 110 that correlates and stores the identification information of a virtual machine subject to monitoring and the classification thereof, and identify the classification of the virtual machine. Thus, it becomes possible to know the classification of and on which physical server in the network, a virtual machine is operating.

An example of a procedure of a monitoring process performed by the monitoring apparatus 100 will be described.

(1) The monitoring apparatus 100 acquires from a physical server included in the physical server group of migration candidates for a virtual machine subject to monitoring, the identification information of a virtual machine operating on the physical server. Here, the identification information of the virtual machine is, for example, an Internet Protocol (IP) address that identifies the virtual machine in an IP network.

In the example depicted in FIG. 1, identification information 120 of a virtual machine operating on the physical server M3 is acquired from the physical server M3 by the monitoring apparatus 100. In this example, the identification information 120 of the virtual machine includes the IP address "VM1" of the virtual machine.

(2) The monitoring apparatus 100 refers to the storage unit 110 and identifies the classification of the virtual machine that corresponds to the acquired virtual machine identification information. Here, the storage unit 110 is a storage apparatus that correlates and stores the identification information of virtual machines subject to monitoring and the classification of the virtual machines.

The classification of a virtual machine, for example, may be correlated with the identification information of the virtual machine and preliminarily defined, or for example, may be identified by the monitoring apparatus 100 by using the IP address of the virtual machine to make an inquiry with the virtual machine. In the example depicted in FIG. 1, a classification "network device" of a virtual machine corresponding to the virtual machine IP address "VM1" included in the identification information 120 of the virtual machine is identified.

(3) The monitoring apparatus 100 correlates and outputs, the identified virtual machine classification, virtual machine identification information, and physical server identification information. The physical server identification information is, for example, the name, model name, IP address, etc. of the physical server. In the example depicted in FIG. 1, apparatus information 130 is output that correlates and indicates the identification information "VM1" and the classification "network device" of a virtual machine operating on the physical server M3, and the identification information "M3" of the physical server M3.

The monitoring apparatus 100, for example, may store the apparatus information 130 to the storage unit 110. In this case, if the monitoring apparatus 100 receives an output request for the apparatus information 130 related to the virtual machine, the monitoring apparatus 100 may output the apparatus information 130 stored in the storage unit 110.

Thus, the monitoring apparatus 100 according to the first embodiment enables the classification of a virtual machine operating on a physical server to be identified, whereby the classification of the virtual machine and the physical server on which the virtual machine is operating can be known.

For example, the apparatus information 130 enables the network manager to know that the virtual machine VM1 of the classification "network device" is operating on the physical server M3 in the network. As a result, if a failure occurs at the virtual machine VM1, the network manager, for example, can refer to connection relations between physical servers on the network to identify the range that will be affected by the failure at the virtual machine M1.

A system 200 according to a second embodiment will be described. Description of portions identical to those described in the first embodiment will be omitted.

Figure 2:
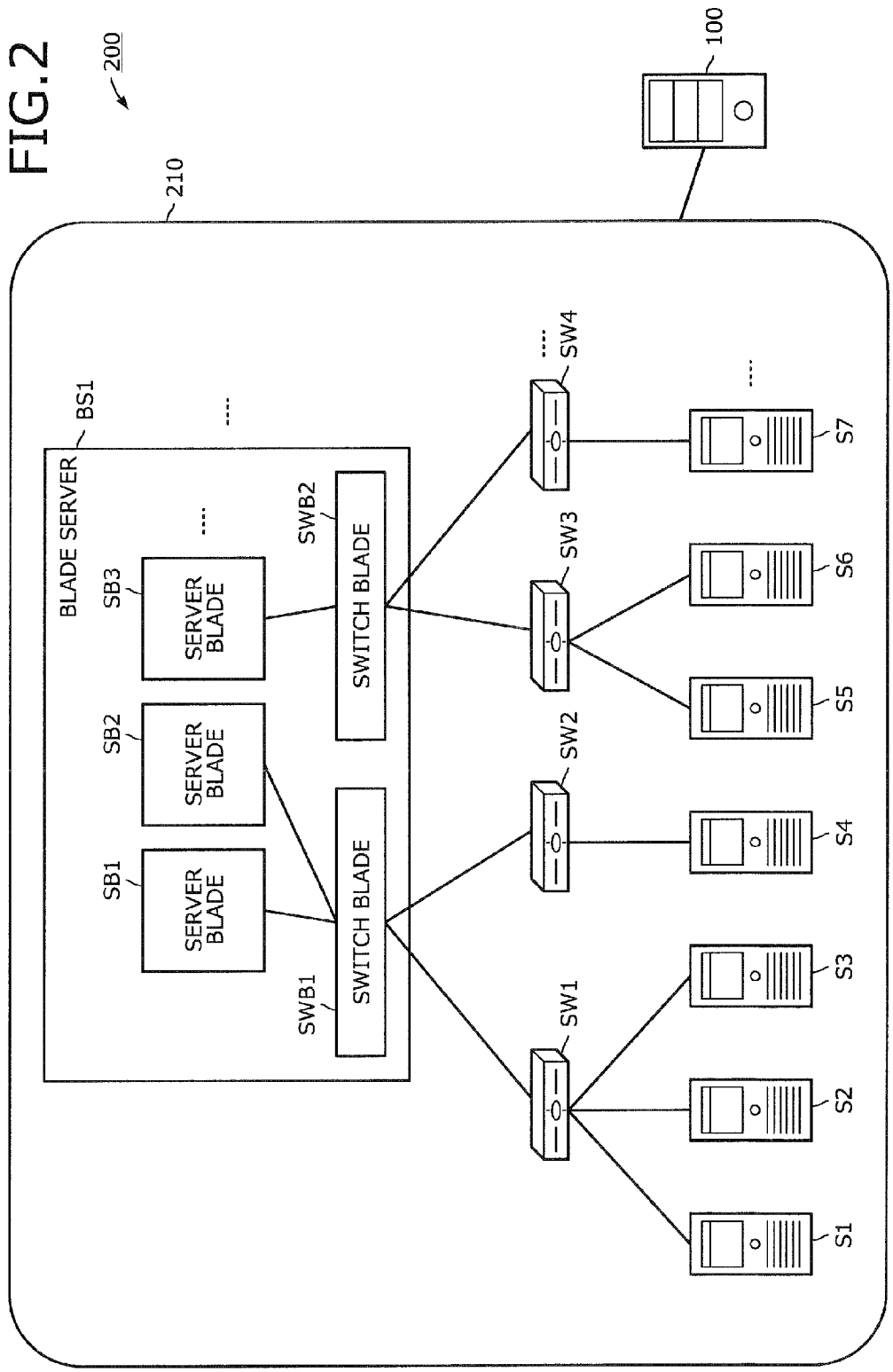
FIG. 2 is a diagram depicting a system configuration example of a system 200.

FIG. 2 is a diagram depicting a system configuration example of the system 200. In FIG. 2, the system 200 includes the monitoring apparatus 100, multiple servers S (e.g., servers S1 to S7), multiple switches SW (e.g., switches SW1 to SW4), and multiple blade servers BS (e.g., blade server BS1).

In the system 200, the monitoring apparatus 100, the servers S, the switches SW, and the blade servers BS are communicably connected through a wired or wireless network 210. The network 210 is, for example, a local area network (LAN), a wide area network (WAN), the Internet, etc.

Here, the servers S are physical servers that provide services according to requests from terminal clients (not depicted) and for example, are world wide web (WEB) servers, application (AP) servers, database (DB) servers, etc. The switches SW are physical network devices that have a packet switching function and for example, are layer (L) 2 switches.

The blade servers BS includes server blades SB (e.g., server blades SB1 to SB3) and switch blades SWB (e.g., switch blades SWB1, SWB2). The server blades SB are physical servers in which server functions are consolidated onto a single board.

Figure 3:
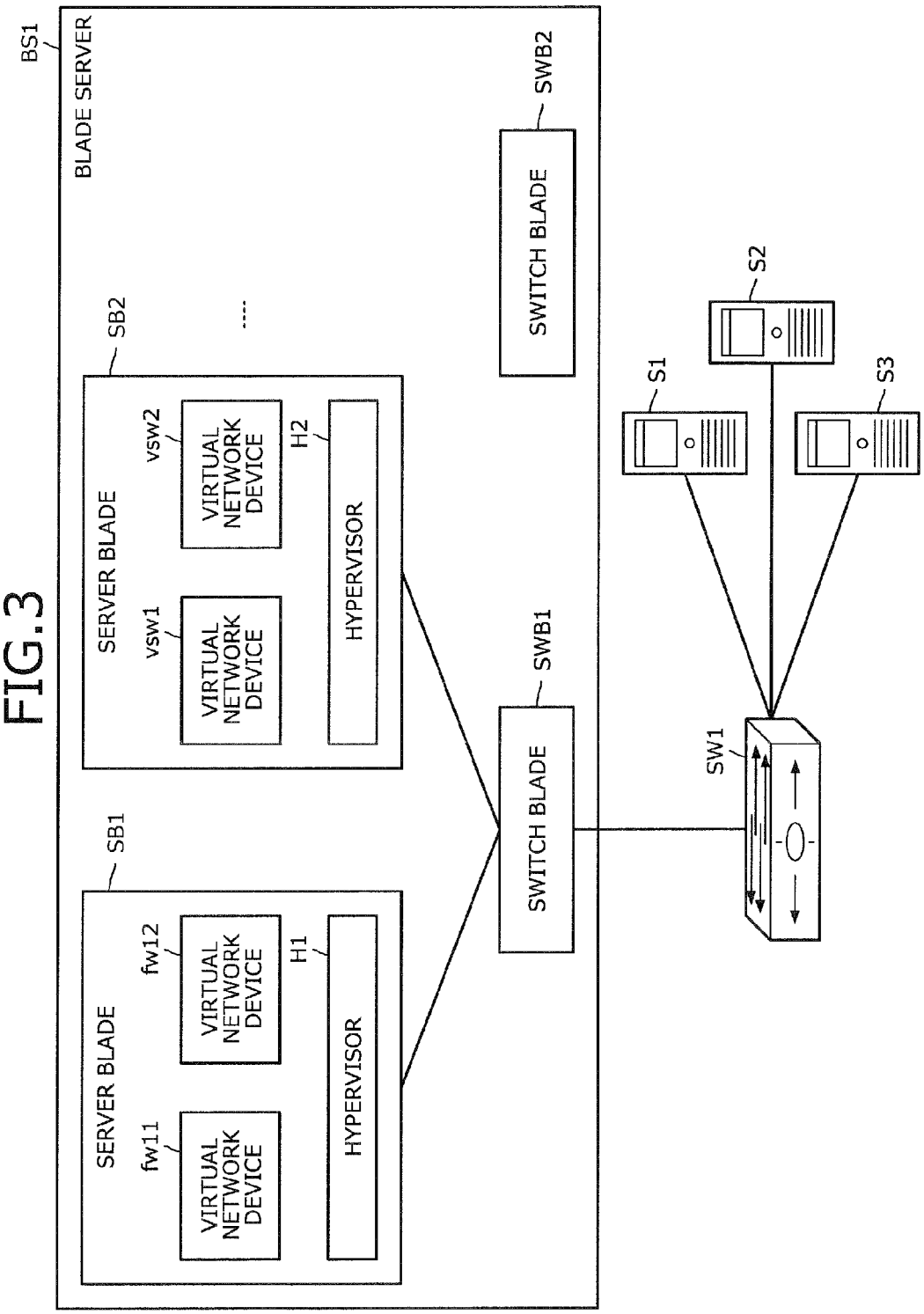
FIG. 3 is a diagram depicting an operation example of virtual machines operating on a server blade.

Virtual machines operating on the physical servers will be described. FIG. 3 is a diagram depicting an operation example of virtual machines operating on a server blade. In FIG. 3, the servers S1 to S3, the switch SW1, and the blade server BS1 are depicted.

Here, the server blades SB1 and SB2 in the blade server BS1 include hypervisors H1 and H2. The hypervisors H1 and H2 are software that virtualizes the hardware resources of the server blades SB1 and SB2 and performs control such that different OSs can be executed. More specifically, for example, the hypervisors H1 and H2 run the OSs by virtual machines that operate in an execution environment built by dividing the hardware resources of the server blades SB1 and SB2.

In the example depicted in FIG. 3, virtual network devices fw11 and fw12 operate in an execution environment built by dividing the hardware resources of the server blade SB1. The virtual network devices fw11 and fw12 are virtual firewalls. Further, virtual network devices vsw1 and vsw2 operate in an execution environment built by dividing the hardware resources of the server blade SB2. The virtual network devices vsw1 and vsw2 are virtual switches.

Figure 4:
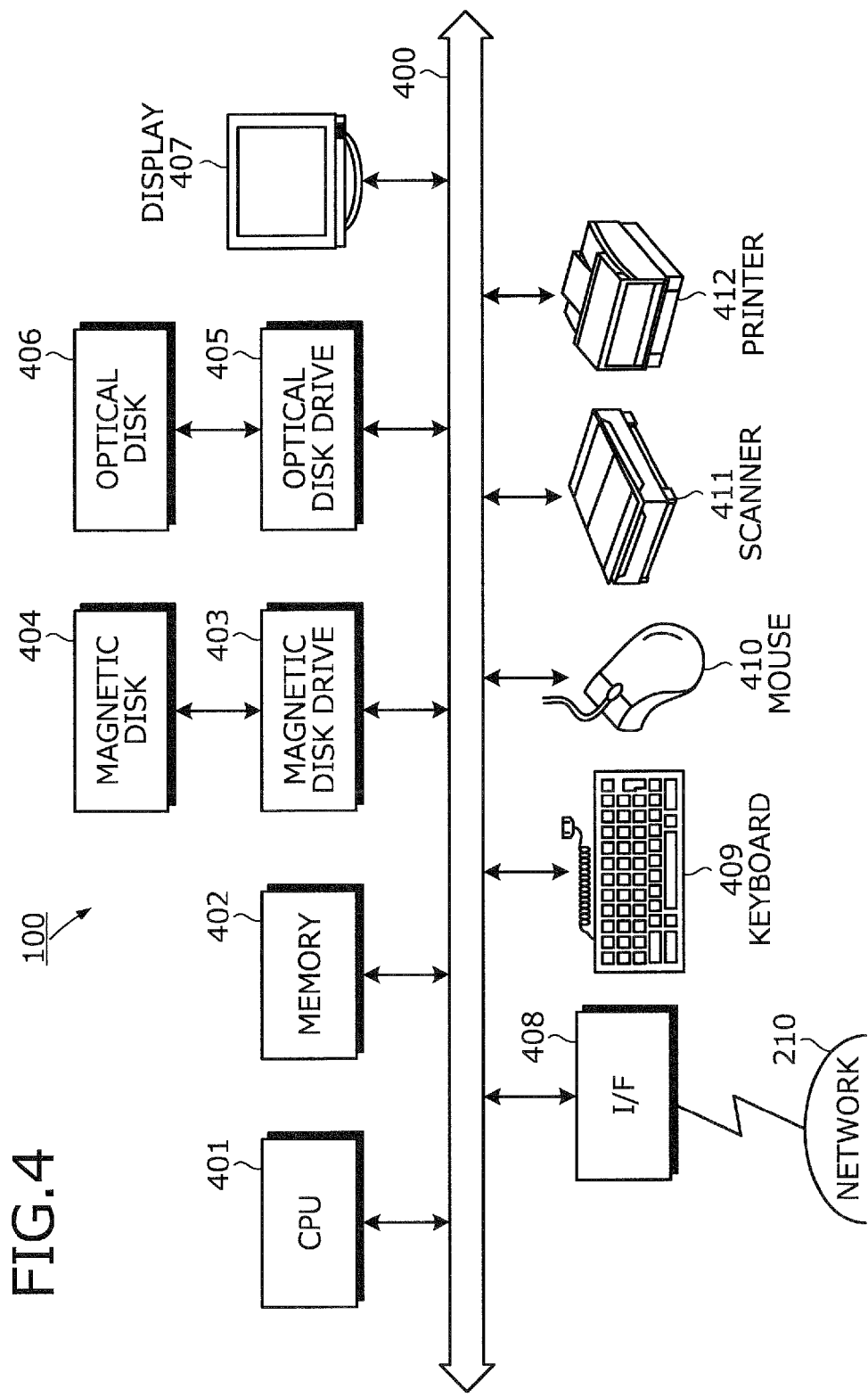
FIG. 4 is a block diagram of a hardware configuration example of a monitoring apparatus 100.

FIG. 4 is a block diagram of a hardware configuration example of the monitoring apparatus 100. In FIG. 4, the monitoring apparatus 100 includes a CPU 401, memory 402, a magnetic disk drive 403, a magnetic disk 404, an optical disk drive 405, an optical disk 406, a display 407, an I/F 408, a keyboard 409, a mouse 410, a scanner 411, and a printer 412, respectively connected by a bus 400.

The CPU 401 governs overall control of the monitoring apparatus 100. The memory 402 includes read-only memory (ROM), random access memory (RAM), and flash ROM. The ROM and flash ROM, for example, store various types of programs such as a boot program. The RAM is used as work area of the CPU 401.

The magnetic disk drive 403, under the control of the CPU 401, controls the reading and writing of data with respect to the magnetic disk 404. The magnetic disk 404 stores data written thereto under the control of the magnetic disk drive 403. The optical disk drive 405, under the control of the CPU 401, controls the reading and writing of data with respect to the optical disk 406. The optical disk 406 stores data written thereto under the control of the optical disk drive 405, the data being read out by a computer.

The display 407 displays data such as documents, images, and functional information, in addition to a cursor, icons, and tool boxes. A cathode ray tube (CRT), a thin-film-transistor (TFT) liquid crystal display, a plasma display, etc., may be employed as the display 407.

The I/F 408 is connected to the network 210 through a communication line and is connected to other apparatuses through the network 210. The I/F 408 administers an internal interface with the network 210 and controls the input and output of data with respect to external apparatuses. For example, a modem or a LAN adaptor may be employed as the I/F 408.

The keyboard 409 includes, for example, keys for inputting letters, numerals, and various instructions and performs the input of data. Alternatively, a touch-panel-type input pad or numeric keypad, etc. may be adopted. The mouse 410 is used to move the cursor, select a region, or move and change the size of windows. A track ball or a joy stick may be adopted provided each respectively has a function similar to a pointing device.

The scanner 411 optically reads an image and takes in the image data into the monitoring apparatus 100. The scanner 411 may have an optical character reader (OCR) function as well. The printer 412 prints image data and text data. The printer 412 may be, for example, a laser printer or an ink jet printer. Among the components above, the configuration of the monitoring apparatus 100 may omit any one or more among the optical disk drive 405, the optical disk 406, the mouse 410, the scanner 411, and the printer 412.

Further, the servers S, the switches SW, the switch blades SWB and the server blades SB depicted in FIG. 2 may be implemented by the a hardware configuration identical to that of the monitoring apparatus 100 above. However, the configuration of the servers S, the switches SW, the switch blades SWB, and the server blades SB may omit the optical disk drive 405, the optical disk 406, the display 407, the keyboard 409, the mouse 410, the scanner 411, and the printer 412.

A device definition chart 500 defining apparatuses subject to monitoring in the system 200 depicted in FIG. 2. In the system 200, apparatuses subject to monitoring are, for example, the servers S, the switches SW, the switch blades SWB, the server blades SB, and virtual machines that operate on physical servers.

Figure 5:
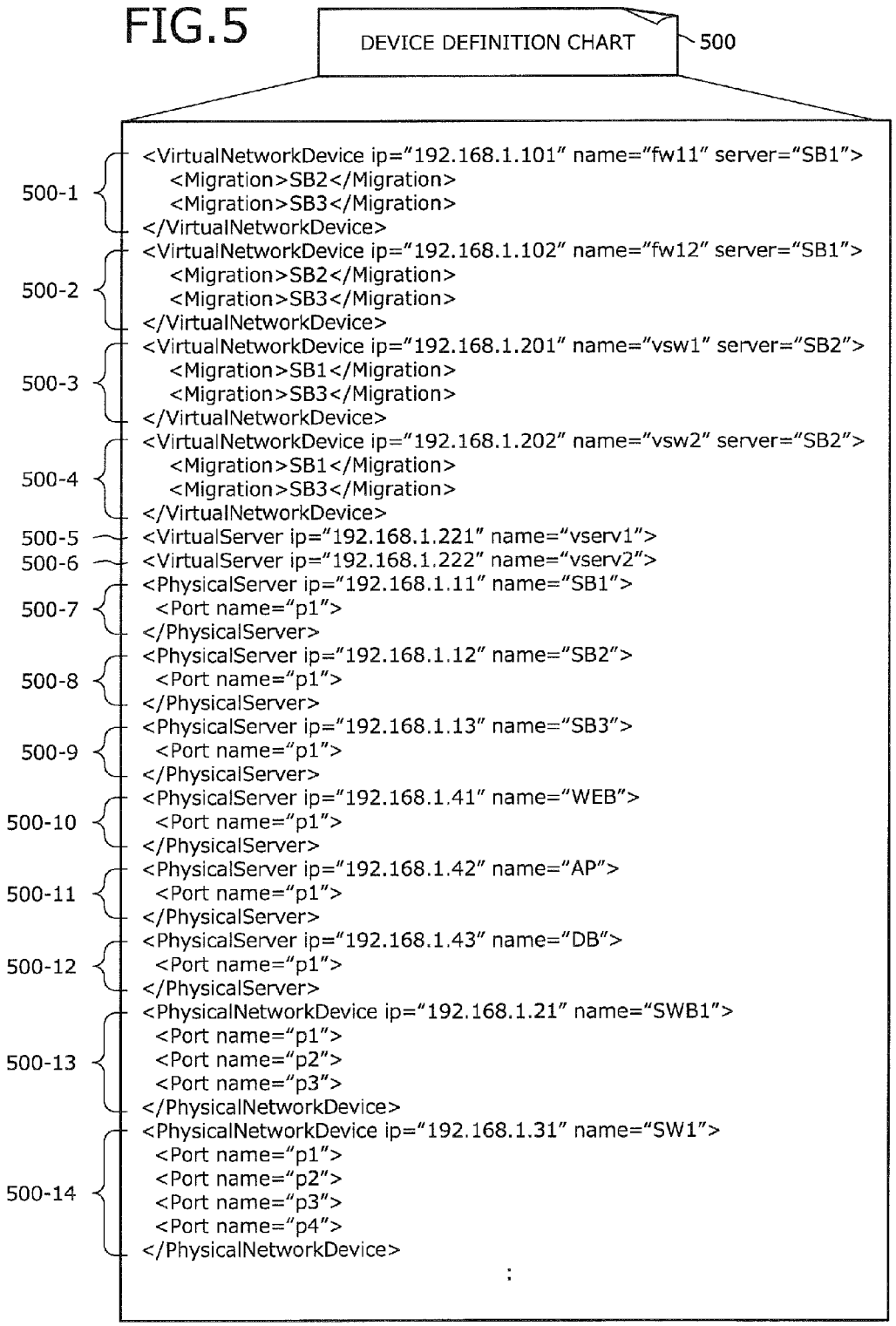
FIG. 5 is a diagram depicting an example of a device definition chart 500.

FIG. 5 is a diagram depicting an example of the device definition chart 500. In FIG. 5, the device definition chart 500 includes device definition information (e.g., device definition information 500-1 to 500-14) for each monitored apparatus in the system 200.

A top tag of the device definition information indicates the classification of the monitored apparatus. For example, "VirtualNetworkDevice" represents a virtual network device. "VirtualServer" represents a virtual server. "PhysicalNetworkDevice" represents a physical network device and "PhysicalServer" represents a physical server.

In other words, the device definition information 500-1 to 500-4 is information that represents virtual network devices in the system 200. For example, in the device definition information 500-1, the IP address "192.168.1.101" and the name "fw11" of a virtual network device is defined. Further, in the device definition information 500-1, the name "SB1" of the physical server operated by the virtual network device fw11 and the names "SB2, SB3" of the physical servers that are migration candidates for the virtual network device fw11 are defined.

Further, the device definition information 500-5 and 500-6 is information that represents virtual servers in the system 200. For example, in the device definition information 500-5, the IP address "192.168.1.221" and the name "vserv1" of a virtual server are defined.

The device definition information 500-7 to 500-12 is information that represents physical servers in the system 200. For example, in the device definition information 500-7, the IP address "192.168.1.11", the name "SB1" and the port name "p1" of a physical server are defined.

The device definition information 500-13 and 500-14 is information that represents ports of the monitored apparatuses. For example, in the device definition information 500-13, the IP address "192.168.1.21", the name, "SWB1", and the port names "p1, p2, p3" of a monitored apparatus are defined.

Although not depicted, in the device definition information, for example, the model names of the monitored apparatuses may be defined. Further, in the device definition chart 500, physical network devices such as the switches SW and switch blades SWB are defined.

A connection-relations definition chart 600 defining connection relations between the monitored apparatus including the servers S, the switches SW, the switch blades SWB, and the server blades SB in the system 200 will be described.

Figure 6:
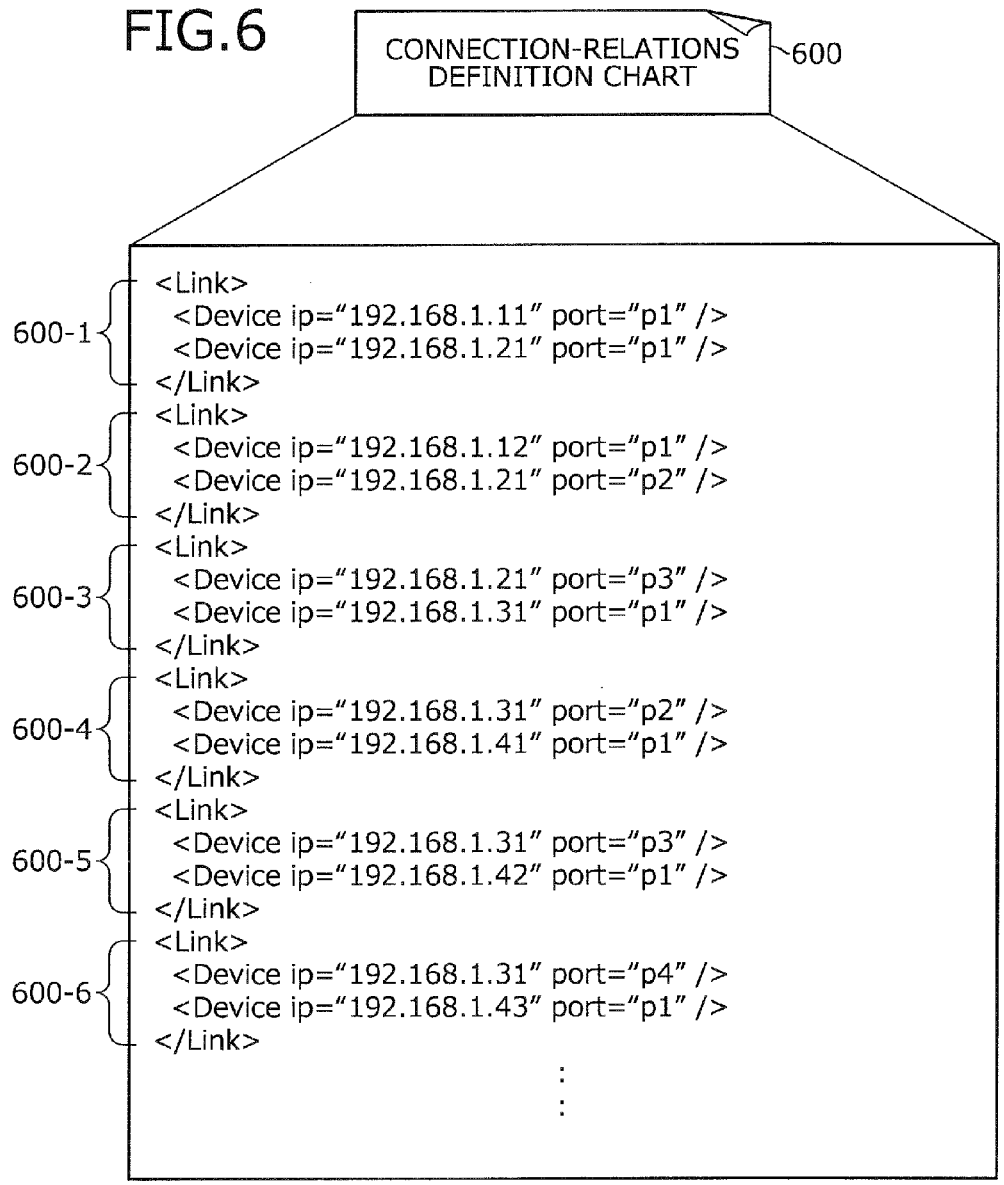
FIG. 6 is a diagram depicting an example of a connection-relations definition chart 600.

FIG. 6 is a diagram depicting an example of the connection-relations definition chart 600. In FIG. 6, the connection-relations definition chart 600 includes connection-relations definition information (e.g., connection-relations definition information 600-1 to 600-6). Connection-relations definition information is information that represents connection relations between monitored apparatuses. In this example, connection relations between monitored apparatuses are expressed by the IP addresses and the port names of the monitored apparatuses.

For example, in the connection-relations definition information 600-1, the connection relation of the IP address "192.168.1.11" and the port name "p1" with the IP address "192.168.1.21" and the port name "p1" is defined. In other words, the connection-relations definition information 600-1 indicates that the port p1 of a monitored apparatus at the IP address "192.168.1.11" and the port p1 of a monitored apparatus at the IP address "192.168.1.21" are connected.

The contents of a device information database (DB) 700 used by the monitoring apparatus 100 will be described. The device information DB 700, for example, is implemented by a storage apparatus such as the memory 402, the magnetic disk 404, and the optical disk 406 depicted in FIG. 4.

Figure 7:
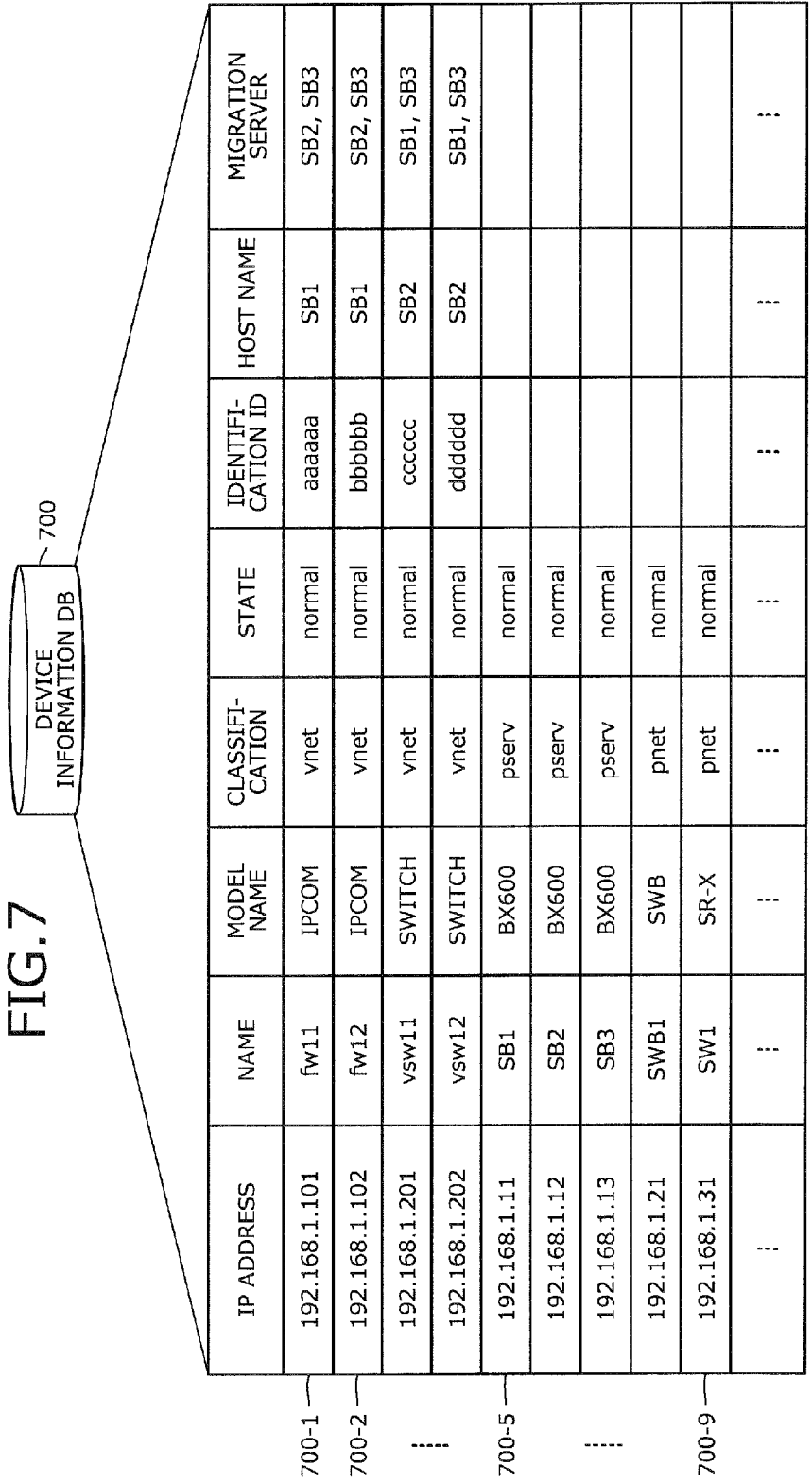
FIG. 7 is a diagram depicting an example of the contents of a device information DB 700.

FIG. 7 is a diagram depicting an example of the contents of the device information DB 700. In FIG. 7, the device information DB 700 has fields for IP addresses, names, model names, classifications, states, identification IDs, host names, and migration servers. By setting information into the fields, device information (e.g., device information 700-1 to 700-9) to each monitored apparatus is stored as records.

Here, the IP address is the IP address of a monitored apparatus. The name is the name of the monitored apparatus. The model name is the model name of the monitored apparatus. The classification is the classification of the monitored apparatus. Classifications of the monitored apparatuses, for example, include virtual network device (vnet), physical network device (pnet), and physical server (pserv). The state is the state of the monitored apparatus. States of the monitored apparatuses, for example, include normal (normal) and abnormal (failure).

The identification ID is an identifier that uniquely identifies a virtual machine subject to monitoring. Virtual machine identification IDs, for example, include Universally Unique Identifiers (UUID) assigned to the virtual machine. The host name is the name of the physical server on which the virtual machine is operating. A migration server is the name of a physical server to which the virtual machine can be migrated.

Taking the device information 700-1 as an example, the IP address "192.168.1.101", the name "fw11", the model name "IPCOM", the classification "vnet", the state "normal", the identification ID "aaaaaa", the host name "SB1", and the migration servers "SB2, SB3" of a monitored virtual machine are indicated. Taking the device information 700-5 as an example, the IP address "192.168.1.11", the name "SB1", the model name "BX600", the classification "pserv", and the state "normal" of a monitored physical server are indicated.

The contents of a connection information DB 800 used by the monitoring apparatus 100 will be described. The connection information DB 800, for example, is implemented by a storage apparatus such as the memory 402, the magnetic disk 404, and the optical disk 406 depicted in FIG. 4.

FIG. 8 is a diagram depicting an example of the contents of the connection information DB 800. In FIG. 8, the connection information DB 800 has fields for connection source IPs, connection source port names, connection destination IPs, and connection destination port names. By setting information into the fields, connection information (e.g., connection information 800-1 to 800-6) among monitored apparatuses is stored as records.

Here, the connection source IP is the IP address of one monitored apparatus among two monitored apparatuses having a connection relation. The connection source port name is the port name of the one monitored apparatus among the two monitored apparatuses. The connection destination IP is the IP address of the other monitored apparatus among the two monitored apparatuses. The connection destination port name is the port name of the other monitored apparatus among the two monitored apparatuses.

Taking the connection information 800-1 as an example, the port p1 of the monitored apparatus at the IP address "192.168.1.11" and the port p1 of the monitored apparatus at the IP address "192.168.1.21" are indicated to be connected.

FIG. 9 is a block diagram of a functional configuration example of the monitoring apparatus 100. In FIG. 9, the monitoring apparatus 100 includes a receiving unit 901, an acquiring unit 902, an identifying unit 903, a detecting unit 904, a determining unit 905, and an output unit 906. The receiving unit 901 to the output unit 906 are functions forming a control unit and for example, are implemented by executing on the CPU 401, a program stored in a storage apparatus such as the memory 402, the magnetic disk 404, and the optical disk 406 depicted in FIG. 4, or by the I/F 408. Further, processing results of the functions are stored to, for example, a storage apparatus such as the memory 402, the magnetic disk 404, and the optical disk 406.

The receiving unit 901 receives input of definition information related to a monitored apparatus. Here, the monitored apparatus is, for example, a physical server, a physical network device, or a virtual machine. A virtual machine is, for example, a virtual server or a virtual network device. The definition information is, for example, information that defines the IP address, the name, the model name, and the classification of the monitored apparatuses.

If the monitored apparatuses are a physical server and a physical network device, for example, in the definition information, port names of the monitored apparatuses may be defined. Further, if the monitored apparatus is a virtual machine, the name of the physical server that the virtual machine first operates physical server and the name of a physical server to which the virtual machine can be migrated may be defined.

More specifically, for example, the receiving unit 901 may receive the device definition chart 500 depicted in FIG. 5 by user input via the keyboard 409 and/or the mouse 410 depicted in FIG. 4. Further, for example, the receiving unit 901 may acquire definition information related to the monitored apparatus by extraction from a library or from an external computer.

The received definition information is stored to the device information DB 700 depicted in FIG. 7, for example. Taking the device definition information 500-1 included in the device definition chart 500 as an example, in the device information DB 700, "192.168.1.101" is set in IP address field, and "fw11" is set in the name field. Further, "vnet" is set in the classification field, "normal" is set in the state field, "SB1" is set in the host name field, and "SB2, SB3" is set in migration server field. Further, if the model name "IPCOM" is defined in the device definition information 500-1, "IPCOM" is set in the model name field.

As a result, the device information 700-1 is stored in the device information DB 700 as a record. At this point, the identification ID field of the device information 700-1 is empty. A detailed description of registering device information into the device information DB 700 will be described with reference to a flowchart depicted in FIG. 13.

The receiving unit 901 receives input of connection information that represents connection relations between monitored apparatuses. Here, connection information is, for example, information that represents a connection relation between two monitored apparatuses that are directly connected. The connection information, for example, is information that represents any one among: a connection relation between a physical server and a physical server, a connection relation between a physical server and a physical network device, and a connection relation between a physical network device and a physical network device.

More specifically, for example, the receiving unit 901 may receive the connection-relations definition chart 600 depicted in FIG. 6, by a user operation. Further, for example, the receiving unit 901 may acquire the connection information representing the connection relation between the monitored apparatuses by extraction from a library or from an external apparatus. The monitoring apparatus 100 may acquire the device information and the connection information by performing a topological search of the network devices, via the network 210.

The received connection information, for example, is stored to the connection information DB 800 depicted in FIG. 8. Taking the connection-relations definition information 600-1 included in the connection-relations definition chart 600 as an example, in the connection information DB 800, "192.168.1.11" is set in the connection source IP field, and "p1" is set in the connection source port name field. Further, "192.168.1.21" is set in the connection destination IP field, and "p1" is set in the connection destination port name field. As a result, the connection information 800-1 is stored in the connection information DB 800 as a record.

The acquiring unit 902 acquires from a physical server that is a migration candidate for the monitored virtual machine, the identification information of virtual machines operating on the physical server. Here, the virtual machine identification information is, for example, the IP address and the UUID of a virtual machine.

More specifically, for example, the acquiring unit 902 selects from the device information DB 700, the device information of the physical server, i.e., the device information in which the classification is "pserv". The acquiring unit 902, using the IP address in the selected device information as a destination, sends to a hypervisor, an inquiry to concerning the identification information of virtual machines operating on the physical server.

Here, if a virtual machine is operating on the physical server, the acquiring unit 902 acquires from the hypervisor, the identification information of the virtual machine operating on the physical server. On the other hand, if no virtual machine is operating on the physical server, the acquiring unit 902 may acquire from the hypervisor, information indicating whether a virtual machine operating on the physical server is present.

The acquiring unit 902 may periodically or arbitrarily acquire from the physical server, the identification information of virtual machines operating on the physical server. Thus, the identification information of virtual machines operating on a monitored physical server can be recursively acquired from the physical server.

The identifying unit 903 refers to information that correlates and represents the identification information of the monitored virtual machines and the classifications of the virtual machines, and identifies the classification of the virtual machine that corresponds to the acquired virtual machine identification information. More specifically, for example, the identifying unit 903 refers to the device information DB 700 and identifies the classification of the virtual machine that corresponds to the acquired virtual machine IP address.

Here, the acquired virtual machine IP address is assumed to be "192.168.1.101". In this case, the identifying unit 903 refers to the device information DB 700, and identifies the classification "vnet (virtual network device)" of the virtual machine that corresponds to the virtual machine IP address "192.168.1.101".

Further, the identifying unit 903 may use the Simple Network Management Protocol (SNMP) to use the acquired virtual machine IP address as a destination to send to the virtual machine, an inquiry concerning the classification of the virtual machine. In this case, the identifying unit 903 refers to the value of the Management Information Base (MIB) of the SNMP, acquired from the virtual machine; and identifies the classification of the virtual machine.

The identifying unit 903 may refer to the device information DB 700 to identify the name, the model name, the state, and the physical server that is a migration candidate of the virtual machine that corresponds to the acquired virtual machine IP address. For example, if the virtual machine IP address is "192.168.1.101", the identifying unit 903 identifies the virtual machine name "fw11", the model name "IPCOM", the state "normal", and the physical server names "SB2, SB3" that are migration candidates.

If the classification of the virtual machine is identified, the detecting unit 904 refers to the connection information that represents connection relations between the monitored apparatuses, and detects a monitored apparatus having a connection relation with the physical server on which the virtual machine is operating. More specifically, for example, the detecting unit 904 refers to the connection information DB 800, and detects another physical server having a connection relation with the physical server on which the virtual machine is operating.

Here, the IP address of the physical server on which the virtual machine is operating, is assumed to be "192.168.1.11". In this case, the detecting unit 904 refers to the connection information DB 800, and detects the connection destination IP "192.168.1.21" having the IP address "192.168.1.11" as the connection source IP.

Thus, the IP address "192.168.1.21" of another monitored apparatus having a connection relation with the physical server on which the virtual machine is operating, can be identified. Further, the detecting unit 904 can refer to the device information DB 700 to identify the name "SWB1" that corresponds to the IP address "192.168.1.21" of the other monitored apparatus.

The detecting unit 904 may refer to the connection information DB 800 and detect the connection destination IP "192.168.1.31" having the IP address "192.168.1.21" of the other monitored apparatus as the connection source IP. Thus, the IP address "192.168.1.31" of another monitored apparatus having an indirect connection relation with the physical server on which the virtual machine is operating, can be identified.

In this manner, the detecting unit 904 refers to the connection information DB 800 to trace IP addresses between monitored apparatuses having connection relations, thereby enabling another monitored apparatus to be detected that has a direct or indirect connection relation with the physical server on which the virtual machine is operating. Detection results, for example, are correlated with the identification information (e.g., the IP address, the name, the model name, etc.) of the physical server on which the virtual machine is operating, and stored to the memory 402.

The determining unit 905 determines the state of a virtual machine operating on a physical server. Determination of the state of a virtual machine operating on a given physical server S of the physical server group will be described. Here, the acquiring unit 902 is assumed to acquire the identification information of virtual machines operating on each physical server, by periodically or arbitrarily sending to each of the physical servers, an inquiry concerning the virtual machines operating on the physical server.

More specifically, for example, the determining unit 905 searches virtual machine identification information acquired consequent to sending inquiries to the physical servers, for the virtual machine identification information acquired from the physical server S the previous time. If the virtual machine identification information acquired from the physical server S the previous time is found, the determining unit 905 determines that state of the virtual machine operating on the physical server S is normal.

On the other hand, if the virtual machine identification information acquired from the physical server S the previous time is not found, the determining unit 905 determines that the state of the virtual machine operating on the physical server S is abnormal. Thus, a virtual machine whose state has become abnormal consequent to a failure occurring at the virtual machine can be detected.

The output unit 906 correlates and outputs the identified classification and identification information of the virtual machine and the identification information of the physical server on which the virtual machine is operating. Here, the output unit 906 may further correlate and output the identification information of another monitored apparatus having a connection relation with the detected physical server.

Forms of output by the output unit 906 include, for example, display on the display 407, print out at the printer 412, and transmission to an external computer via the I/F 408, as well as storage to a storage apparatus such as the memory 402, the magnetic disk 404, and the optical disk 406.

More specifically, for example, the output unit 906 may register into the device information DB 700, device information that correlates and represents the classification and the identification information of the identified virtual machine and the identification information of the physical server on which the virtual machine is operating. In this case, for example, the output unit 906 may output the device information of the virtual machine stored in the device information DB 700, when an output request for the device information related to the virtual machine is received.

More specifically, for example, the receiving unit 901 receives by user input, a display request for the device information related to the virtual machine. The output unit 906 may refer to the device information DB 700 and display on the display 407, the device information of the virtual machine for which the display request is received. The device information that is output is at least any one among the classification of the virtual machine for which the display request is received, the identification information of the physical server on which the virtual machine is operating, and the identification information of another monitored apparatus having a connection relation with the physical server.

Description will be given taking, as an example, a case where the receiving unit 901 receives a display request for device information related to a virtual machine of the name "fw11". In this case, the output unit 906 extracts from the device information DB 700, the device information 700-1 that corresponds to the name "fw11" of the virtual machine for which the device information display request was received. The output unit 906 displays on the display 407, the extracted device information 700-1 that corresponds to the virtual machine name "fw11". Here, the output unit 906 may display on the display 407, the device information 700-1 related to the name "fw11" and the identification information (e.g., the name, the model name) of another monitored apparatus having a direct or indirect connection relation with the physical server on which the virtual machine of the name "fw11" is operating.

The output unit 906 may further output determination results. More specifically, for example, if the state of the virtual machine operated on the physical server S is determined to be abnormal, the output unit 906 may change in the device information DB 700, the state in the device information of the virtual machine to "failure (abnormal)".

Examples of output screens displayed on the display will be described with reference to FIGS. 10 to 13. The various screen examples described, for example, are created by the monitoring apparatus 100, based on the contents of the device information DB 700 and the contents of the connection information DB 800.

FIG. 10 is a diagram depicting a screen example of the display 407 (part 1). In FIG. 10, a system list screen 1010 of a Web 3-tier model 1000 built in the system 200 (refer to FIG. 2) is displayed on the display 407. The system list screen 1010 is an example of a screen that displays the virtual network devices fw11 and fw12, which are end points of the Web 3-tier model 1000, and the servers S1 to S3.

Here, the virtual network devices fw11 and fw12 are virtual firewalls operating on a physical server in the system 200. Further, the server S1 is a WEB server; the server S2 is an AP server; and the server S3 is a DB server.

In the system list screen 1010, for example, when a cursor C is moved and the virtual network device fw11 is clicked by a user input operation via the keyboard 409 and/or the mouse 410, a display request for the device information related to the virtual network device fw11 is input. As a result, a system details screen 1020 is displayed on the display 407.

The system details screen 1020 is an example of a screen that displays the server blade SB1 on which the virtual network device fw11 is operating. Further, in the system details screen 1020, the virtual network device fw11 and the operating virtual network device fw12 are displayed on the server blade SB1.

The system details screen 1020 enables, for example, the network manager to know that the virtual network device fw11 is the virtual machine operating on the server blade SB1, and to know that the virtual network device fw12, which is another virtual machine, is operating on the server blade SB1.

In the system details screen 1020, when the cursor C is moved and the virtual network device fw11 is clicked by a user input operation, a display request for the device information related to the virtual network device fw11 is input. As a result, a system details screen 1030 is displayed on the display 407.

The system details screen 1030 is an example of a screen that displays the device information of the virtual network device fw11. In the system details screen 1030, network device name, the system name, the IP address, the apparatus state, the server name, the migration server(s) and the relation server(s) are displayed.

From the network device name, the network manager can know the name of the virtual network device fw11, for example. From the system name, the network manager can know the model name of the virtual network device fw11, for example. From the IP address, the network manager can know the IP address of the virtual network device fw11, for example.

From the apparatus state, the network manager can know the state of the virtual network device fw11. From the server name, the network manager can know the name of the physical server on which the virtual network device fw11 is operating. From the migration servers, the network manager can know the name of a physical server to which the virtual network device fw11 can be migrated.

From the relation servers, the network manager can know the name of a monitored apparatus having a connection relation with the physical server on which the virtual network device fw11 is operating, for example. Here, among the physical server on which the virtual network device fw11 is operating and the monitored apparatus having a connection relation, only the physical server is displayed.

The system details screens 1020 and 1030, for example, are created by referring to the device information DB 700 and the connection information DB 800. More specifically, for example, the monitoring apparatus 100 creates the system details screen 1020, based on the device information 700-1 and 700-2 in the device information DB 700. Further, the monitoring apparatus 100 can create the system details screen 1030, based on the device information 700-1 in the device information DB 700 and the connection information 800-1, 800-3 to 800-6 in the connection information DB 800.

FIG. 11 is a diagram depicting a screen example of the display 407 (part 2). In FIG. 11, a network device list screen 1110 is displayed on the display 407. The network device list screen 1110 is an example of a screen that displays a list of network devices in the system 200.

In the network device list screen 1110, for example, when the cursor C is moved and the virtual network device fw11 is clicked by a user input operation, a display request for the device information related to the virtual network device fw11 is input. As a result, a details screen 1120 is displayed on the display 407.

The details screen 1120 is an example of screen that displays the device information related to the virtual network device fw11. In the details screen 1120, basic information 1121 and server information 1122 are displayed. For example, in the basic information 1121, the network device name, the system name, the IP address, and the apparatus state are displayed. In the server information 1122, the server name, the migration server(s), and the relation server(s) are displayed.

The network device list screen 1110, for example, is created based on the contents of the device information DB 700. Further, for example, the details screen 1120 is created based on the contents of the device information DB 700 and the contents of the connection information DB 800.

FIG. 12 is a diagram depicting a screen example of the display 407 (part 3). In FIG. 12, a system list screen 1210 of the Web 3-tier model 1000 is displayed on the display 407. Further, in the system list screen 1210, a mark M is displayed indicating that the state of the virtual network device fw11 is abnormal. From the mark M, the network manager can know that the state of the virtual network device fw11 is abnormal, for example.

In the system list screen 1210, when the cursor C is moved and the virtual network device fw11 is clicked by a user input operation, a display request for the device information related to the virtual network device fw11 is input. As a result, a system details screen 1220 is displayed on the display 407.

From the system details screen 1220, the network manager can know that for some reason, a failure has occurred at the virtual network device fw11 only, since the mark M is displayed on in the virtual network device fw11.

In the system details screen 1220, when the cursor C is moved and the virtual network device fw11 is clicked by a user input operation, a display request for the device information related to the virtual network device fw11 is input. As a result, a system details screen 1230 is displayed on the display 407.

From the relation servers in the system details screen 1230, the network manager can know that a failure occurring for some reason at the virtual network device fw11 may affect the server S1 (WEB server), the server S2 (AP server), and the server S3 (DB server).

Procedures of various processes of the monitoring apparatus 100 will be described. First, a procedure of a registration process of registering the device information of a monitored apparatus into the device information DB 700 will be described. The registration process, for example, is executed at the first registration of the monitored apparatus. Further, the registration process may be executed when a monitored apparatus is added or deleted.

FIG. 13 is a flowchart of a procedure of the registration process of the monitoring apparatus 100. In the flowchart depicted in FIG. 13, the monitoring apparatus 100 determines whether input of the device definition chart 500 and the connection-relations definition chart 600 has been received (step S1301). Here, the monitoring apparatus 100 awaits input of the device definition chart 500 and the connection-relations definition chart 600 (step S1301: NO).

When input of the device definition chart 500 and the connection-relations definition chart 600 has been received (step S1301: YES), the monitoring apparatus 100 selects from the device definition chart 500, the device definition information of an apparatus to be subject to monitoring (step S1302). The monitoring apparatus 100 refers to the selected device definition information and determines whether the classification of the monitored apparatus is a physical server (step S1303).

If the classification is a physical server (step S1303: YES), the monitoring apparatus 100 refers to the selected device definition information and registers the device information of the monitored apparatus into the device information DB 700 (step S1304). The monitoring apparatus 100 sends to the hypervisor of the monitored apparatus, an inquiry concerning the identification information of virtual machines operating on the monitored apparatus (step S1305).

The monitoring apparatus 100 determines whether the identification information of a virtual machine has been acquired from the hypervisor of the monitored apparatus (step S1306). If no identification information of a virtual machine has been acquired (step S1306: NO), the monitoring apparatus 100 transitions to step S1312.

On the other hand, if identification information of a virtual machine has been received (step S1306: YES), the monitoring apparatus 100 refers to the device definition chart 500 and identifies the classification of the virtual machine that corresponds to the virtual machine identification information (step S1307). The monitoring apparatus 100 determines whether the identified virtual machine classification is a virtual network device (step S1308).

If the identified virtual machine classification is not a virtual network device (step S1308: NO), the monitoring apparatus 100 returns to step S1305. On the other hand, if the identified virtual machine classification is a virtual network device (step S1308: YES), the monitoring apparatus 100 refers to the device definition chart 500 and identifies the device information of the virtual machine that corresponds to the virtual machine identification information (step S1309). The monitoring apparatus 100 registers the identified virtual machine device information into the device information DB 700 (step S1310), and returns to step S1305.

At step S1303, if the classification is not a physical server (step S1303: NO), the monitoring apparatus 100 refers to the selected device definition information and registers the device information of the monitored apparatus into the device information DB 700 (step S1311). The monitoring apparatus 100 determines whether unselected device definition information that is of an apparatus to be subject to monitoring and has yet to be selected is present in the device definition chart 500 (step S1312).

If unselected device definition information is present (step S1312: YES), the monitoring apparatus 100 returns to step S1302. If no unselected device definition information is present (step S1312: NO), the monitoring apparatus 100 refers to the connection-relations definition chart 600 and registers into the connection information DB 800, connection information concerning connections between the monitored apparatuses (step S1313), ending a series of operations according to the flowchart.

Thus, the device information of physical servers, physical network devices, virtual servers, and virtual network devices subject to monitoring can be registered into the device information DB 700.

Although a case has been described where at step S1305, the monitoring apparatus 100 acquires virtual machine identification information by sending an inquiry to the hypervisor of monitored apparatus, operation is not limited hereto. For example, the monitoring apparatus 100 may refer to the device definition chart 500 and identify the identification information, classification, and migration servers, etc. of a virtual machine operating on a monitored apparatus.

Although a case has been described where at step S1307, the monitoring apparatus 100 refers to the device definition chart 500 and identifies the classification of a virtual machine that corresponds to the virtual machine identification information, operation is not limited hereto. For example, the monitoring apparatus 100 may use SNMP to use the IP address of the virtual machine as a destination to send to the virtual machine, an inquiry concerning the classification of the virtual machine.

A procedure of the monitoring process of monitoring an apparatus to be subject to monitoring will be described. The monitoring process is periodically executed every 5 minutes, 30 minutes, 1 hour, etc., for example. Further, for example, the monitoring process may be executed at an arbitrary timing by a user input operation.

FIG. 14 is a flowchart of an example of a procedure of the monitoring process of the monitoring apparatus 100. In the flowchart depicted in FIG. 14, the monitoring apparatus 100 selects from the device information DB 700, the device information of an apparatus to be subject to monitoring (step S1401). The monitoring apparatus 100 refers to the selected device information and determines whether the classification of the monitored apparatus is a physical server (step S1402).

If the classification is not a physical server (step S1402: NO), the monitoring apparatus 100 transitions to step S1411. On the other hand, if the classification is a physical server (step S1402: YES), the monitoring apparatus 100 sends to the hypervisor of the monitored apparatus, an inquiry concerning the identification information of a virtual machine operating on the monitored apparatus (step S1403).

The monitoring apparatus 100 determines whether communication with the monitored apparatus has become impossible (step S1404). If communication with the monitored apparatus is possible (step S1404: NO), the monitoring apparatus 100 determines whether the virtual machine identification information has been acquired from the hypervisor of the monitored apparatus (step S1405).

If the virtual machine identification information has not been acquired (step S1405: NO), the monitoring apparatus 100 transitions to step S1411. If the virtual machine identification information has been received (step S1405: YES), the monitoring apparatus 100 refers to the device information DB 700 and identifies the classification of the virtual machine that corresponds to the acquired virtual machine identification information (step S1406).

The monitoring apparatus 100 determines whether the identified virtual machine classification is a virtual network device (step S1407). If the classification is not a virtual network device (step S1407: NO), the monitoring apparatus 100 returns to step S1403. If the classification is a virtual network device (step S1407: YES), the monitoring apparatus 100 refers to the connection information DB 800 and detects another physical server having a connection relation with the physical server on which the virtual machine is operating (step S1408). The monitoring apparatus 100 stores the acquired virtual machine identification information to the memory 402 (step S1409), and returns to step S1403.

At step S1404, if communication with the monitored apparatus has become impossible (step S1404: YES), the monitoring apparatus 100 stores to the memory 402, the device information of the monitored apparatus with which communication has become impossible (step S1410). The monitoring apparatus 100 determines whether unselected device information is present that has yet to be selected from the device information DB 700 (step S1411).

If unselected device information is present (step S1411: YES), the monitoring apparatus 100 returns to step S1401. If no unselected device information is present (step S1411: NO), the monitoring apparatus 100 executes an updating process with respect to the device information DB 700 (step S1412), ending a series of operations according to the flowchart.

Thus, the state of a physical server and virtual network device subject to monitoring can be monitored periodically or arbitrarily. At step S1408, if an output request for the device information related to the virtual machine has been received, for example, detection results are output together with the device information of the virtual machine.

The updating process at step S1412 in FIG. 14 will be described in detail.

FIG. 15 is a flowchart of a procedure of the updating process. In FIG. 15, the monitoring apparatus 100 determines whether the device information of the monitored apparatus with which communication has become impossible is stored in the memory 402 (step S1501). If the device information of the monitored apparatus is not stored in the memory 402 (step S1501: NO), the monitoring apparatus 100 transitions to step S1506.

On the other hand, if the device information of the monitored apparatus is stored in the memory 402 (step S1501: YES), the monitoring apparatus 100 identifies in the device information DB 700, the device information of the monitored apparatus (step S1502).

The monitoring apparatus 100 changes the state of the monitored apparatus to "abnormal" in the identified device information (step S1503). More specifically, for example, the monitoring apparatus 100 sets "failure" in the state field of the device information identified in the device information DB 700. As result, the state of the monitored apparatus with communication has become impossible can be changed to "abnormal".

The monitoring apparatus 100 identifies in the device information DB 700, the device information in which the name of the monitored apparatus is set in the host name field (step S1504). As a result, the device information of a virtual machine operating on the monitored apparatus can be identified.

The monitoring apparatus 100 changes the state of the virtual machine to "abnormal" in the identified device information (step S1505). As a result, the state of the virtual machine operating on the monitored apparatus can be changed to "abnormal".

The monitoring apparatus 100 selects from the device information DB 700, the device information of an apparatus that is to be subject to monitoring (step S1506). The monitoring apparatus 100 refers to the selected device information and determines whether the classification of the monitored apparatus is a virtual network device (step S1507). If the classification is not a virtual network device (step S1507: NO), the monitoring apparatus 100 transitions to step S1512.

On the other hand, if the classification is a virtual network device (step S1507: YES), the monitoring apparatus 100 searches the memory 402 for the device information of the a virtual machine that corresponds to the selected device information (step S1508). The device information of a virtual machine that corresponds to the selected device information is device information in which the same IP address or identification ID as that in the selected device information is set.

The monitoring apparatus 100 determines whether the device information of a virtual machine has been found (step S1509). If the device information of a virtual machine has been found (step S1509: YES), the monitoring apparatus 100 determines whether the information set in the host name field of the selected device information differs from the found device information (step S1510).

If the information set in the host name field does not differ (step S1510: NO), the monitoring apparatus 100 transitions to step S1512. In other words, since no failure has occurred at the virtual machine and no migration thereof between physical servers has occurred, in the device information DB 700, the device information of the virtual machine is not changed.

On the other hand, if the information set in the host name field differs (step S1510: YES), the monitoring apparatus 100 changes the host name of the virtual machine (step S1511). More specifically, for example, the monitoring apparatus 100 changes the information set in the host name field of the selected device information to the information set in the host name field of the found device information. As a result, the host name of the virtual machine can be changed to the name of the physical server that is the migration destination.

The monitoring apparatus 100 determines whether unselected device information that has yet to be selected is present in the device information DB 700 (step S1512). If unselected device information is present (step S1512: YES), the monitoring apparatus 100 returns to step S1506. On the other hand, if no unselected device information is present (step S1512: NO), the monitoring apparatus 100 ends the series of operations according to the flowchart.

At step S1509, if no device information of a virtual machine is found (step S1509: NO), the monitoring apparatus 100 changes the state of the virtual machine to "abnormal" in the selected device information (step S1513) and transitions to step S1512. As a result, the state of the virtual machine at which a failure has occurred can be changed to "abnormal".

Thus, in the device information DB 700, the device information of a physical server and a virtual network device subject to monitoring can be updated periodically or arbitrarily.

If the hypervisor equipped in a physical server is not monitoring the state of the virtual machines operating on the physical server, at step S1405 in FIG. 14, the monitoring apparatus 100 may acquire from the hypervisor, the identification information of a virtual machine that is not operating consequent to the occurrence of some failure. Thus, at step S1406, the monitoring apparatus 100, for example, uses SNMP to use the IP address of the virtual machine as a destination to send to the virtual machine, an inquiry concerning the classification of the virtual machine. As a result, even if the hypervisor is not monitoring the state of the virtual machine, the monitoring apparatus 100 can detect virtual machines at which a failure has occurred.

Although only a case where the state of a monitored apparatus is changed to "abnormal" has been described, operation is not limited hereto. For example, if restoration of the monitored apparatus at which a failure has occurred is detected, the monitoring apparatus 100 may change the state of the monitored apparatus from "abnormal" to "normal".

More specifically, for example, if restoration completion notification indicating that restoration of the monitored apparatus has been performed is received by a user input operation, the monitoring apparatus 100 may change the state in the device information of the monitored apparatus from "abnormal" to "normal". Further, for example, at step S1401 in FIG. 14, the state of the monitored apparatus is assumed to be "abnormal" in the selected device information. In this case, for example, if communication with the monitored apparatus is possible at step S1404 (step S1404: NO), the monitoring apparatus 100 may change the state of the monitored apparatus from "abnormal" to "normal" in the selected device information. Further, for example, at step S1506 in FIG. 15, the state of the monitored apparatus is assumed to be "abnormal" in the selected device information. In this case, for example, if device information is found at step S1509 (step S1509: YES), the monitoring apparatus 100 may change the state of the virtual machine from "abnormal" to "normal" in the selected device information.

If among virtual machines defined in the device definition chart 500, a given virtual machine is to be subject to monitoring, the monitoring apparatus 100 may send to a physical server that is a migration candidate defined in the device information of the given virtual machine, an inquiry concerning the identification information of the virtual machine, at step S1403. As a result, the processing load of the monitoring apparatus 100 and the volume of communication for the monitoring process with respect to the given virtual machine can be reduced.

As described, the monitoring apparatus 100 according to the second embodiment enables the identification information of a virtual machine operating on a physical server, to be acquired from the physical server and the classification of the virtual machine that corresponds to the acquired virtual machine identification information to be identified. The monitoring apparatus 100 enables the classification of the virtual machine, the identification information of the virtual machine, and the identification information of the physical server on which the virtual machine is operating to be correlated and output.

Thus, the user such as the network manager, etc. can know the classification of a monitored virtual machine and the host name (name) of the physical server on which the virtual machine is operating.

The monitoring apparatus 100 enables the device information DB 700 to be referred to and the classification of the virtual machine that corresponds to the acquired virtual machine identification information to be identified. Thus, without directly inquiring with the virtual machine, the classification of the virtual machine can be identified, enabling the volume of communication for identifying the classification of the virtual machine to be reduced.

The monitoring apparatus 100 enables the connection information DB 800 to be referred to and another physical server having a connection relation with the physical server on which the virtual machine is operating to be detected. The monitoring apparatus 100 further enables the identification information of the other server to be correlated and output, if the classification of the virtual machine is a virtual network device.

Thus, the user such as the network manager can know classification of a monitored virtual machine and the host name of the physical server on which the virtual machine is operating, making identification of an affected ranged easier to identify when a failure occurs at a virtual network device.

The monitoring apparatus 100 enables device information related to a virtual machine and stored in the device information DB 700 to be output, if an output request for the device information is received. Thus, the user such as the network manager can confirm at an arbitrary timing, the classification of a monitored virtual machine, the physical server on which the virtual machine is operating, and other physical servers having a connection relation to the physical server.

The monitoring apparatus 100 enables the state of virtual machines operating on physical servers to be determined by periodically or arbitrarily sending an inquiry to a physical server that is subject to monitoring. Further, if the state of the virtual machine operation in the physical server becomes "abnormal", the monitoring apparatus 100 enables state information indicating that the state of the virtual machine is "abnormal" to be correlated and output with the classification and identification information of the virtual machine, and the identification information of the physical server on which the virtual machine is operating.

Thus, the user such as the network manager can know the classification and state of a monitored virtual machine, and the host name of the physical server on which the virtual machine is operating.

The monitoring apparatus 100 enables SNMP to be used to send to an acquired IP address of a virtual machine, an inquiry concerning the classification of the virtual machine, whereby the classification of the virtual machine that corresponds to the virtual machine identification information can be identified. In other words, configuration may be such that if the acquired virtual machine identification information includes the IP address of the virtual machine, the monitoring apparatus 100 uses the acquired IP address as a destination to send an inquiry to the virtual machine as needed, whereby the classification of the virtual machine is identified. Thus, even if the hypervisor is not monitoring the state of the virtual machine, the monitoring apparatus 100 can detect a virtual machine at which a failure has occurred.

The monitoring method described in the present embodiment may be implemented by executing a prepared program on a computer such as a personal computer and a workstation. The program is stored on a non-transitory, computer-readable recording medium such as a hard disk, a flexible disk, a CD-ROM, an MO, and a DVD, read out from the computer-readable medium, and executed by the computer. The program may be distributed through a network such as the Internet.

According to one aspect of the embodiments, the classification of a virtual machine operating on a physical server can be identified.

All examples and conditional language provided herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A non-transitory, computer-readable recording medium storing a monitoring program that causes a computer to execute a process comprising:
    acquiring identification information of a virtual machine operating on a server included in a group of servers among which a monitored virtual machine is movable;
    detecting another server having a connection relation with the server included in the group of servers, by referring to connection information that indicates connection relations among the servers of the group of servers; and
    correlating and outputting, when identification information of the virtual machine previously acquired from the server is not included in the acquired identification information of the virtual machine, state information that indicates that a state of the virtual machine operating on the server is abnormal, with the identification information of the virtual machine, identification information of the server, and identification information of the other server having the connection relation with the server.

2. The computer-readable recording medium according to claim 1, the process comprising
    identifying classification of the virtual machine that corresponds to the identification information of the virtual machine acquired from the server, by referring to a storage unit that correlates and stores identification information of the monitored virtual machine and classification of the monitored virtual machine, wherein
    the classification of the virtual machine operating on the server is correlated and output at the correlating and outputting.

3. The computer-readable recording medium according to claim 2, wherein the identification information of the other server having the connection relation with the server is correlated and output at the correlating and outputting, when the classification of the virtual machine operating on the server is classification representing a network device.

4. The computer-readable recording medium according to claim 3, the process comprising
    correlating and storing to the storage unit, when the identification information of the virtual machine previously acquired from the server is not included in the acquired identification information of the virtual machine, the state information that indicates that the state of the virtual machine operating on the server is abnormal, with the identification information of the virtual machine, the identification information of the server, and the identification information of the other server having the connection relation with the server, wherein upon receiving an output request for information related to the virtual machine operating on the server, the state information that indicates that the state of the virtual machine operating on the server is abnormal, the identification information of the virtual machine, the identification information of the server, and the identification information of the other server having the connection relation with the server that are correlated and stored in the storage unit are output at the correlating and outputting.

5. A monitoring method comprising:

acquiring identification information of a virtual machine operating on a server included in a group of servers among which a monitored virtual machine is movable;

detecting another server having a connection relation with the server included in the group of servers, by referring to connection information that indicates connection relations among the servers of the group of servers; and correlating and outputting, when identification information of the virtual machine previously acquired from the server is not included in the acquired identification information of the virtual machine, state information that indicates that a state of the virtual machine operating on the server is abnormal, with the identification information of the virtual machine, identification information of the server, and identification information of the other server having the connection relation with the server, wherein the monitoring method is executed by a computer.

6. A monitoring apparatus comprising a memory; and a processor coupled to the memory and configured to:

acquire identification information of a virtual machine operating on a server included in a group of server among which a monitored virtual machine is movable;

detect another server having a connection relation with the server included in the group of servers, by referring to connection information that indicates connection relations among the servers of the group of servers; and correlate and output, when identification information of the virtual machine previously acquired from the server is not included in the acquired identification information of the virtual machine, state information that indicates that a state of the virtual machine operating on the server is abnormal, with the identification information of the virtual machine, identification information of the server, and identification information of the other server having the connection relation with the server.

* * * * *